(12) United States Patent
Schmidt et al.

(10) Patent No.: US 6,858,335 B2
(45) Date of Patent: Feb. 22, 2005

(54) FUEL CELL POWER SYSTEMS AND METHODS OF OPERATING FUEL CELL POWER SYSTEMS

(75) Inventors: Timothy J. Schmidt, Spokane, WA (US); Peter D. DeVries, Spokane, WA (US); Jonathan Dodge, Bend, OR (US)

(73) Assignee: Relion, Inc., Spokane, WA (US)

( * ) Notice: Subject to any disclaimer, the term of this patent is extended or adjusted under 35 U.S.C. 154(b) by 468 days.

(21) Appl. No.: 09/987,225

(22) Filed: Nov. 14, 2001

(65) Prior Publication Data

US 2003/0091882 A1 May 15, 2003

(51) Int. Cl.$^7$ ............................................. H01M 8/04
(52) U.S. Cl. .................................... 429/13; 429/23
(58) Field of Search ................................ 429/13, 23

(56) References Cited

U.S. PATENT DOCUMENTS 6,428,918 B1 * 8/2002 Fuglevand et al. ............ 429/13
6,503,649 B1 * 1/2003 Czajkowski et al. .......... 429/23

FOREIGN PATENT DOCUMENTS

WO    WO 01/78176    * 10/2001

* cited by examiner

*Primary Examiner*—Jonathan Crepeau
(74) *Attorney, Agent, or Firm*—Wells St. John P.S.

(57) ABSTRACT

Fuel cell power systems and methods of operating fuel cell power systems are described. According to one aspect, a fuel cell power system includes a fuel cell configured to generate electrical energy; switch mode power conditioning circuitry configured to electrically condition the electrical energy generated by the fuel cell, wherein the switch mode power conditioning circuitry comprises a controller configured to monitor an electrical status of the fuel cell and to adjust the conditioning of the electrical energy using the switch mode power conditioning circuitry responsive to the monitoring, wherein the controller is configured to provide a pulse width modulated control signal to control the switching of the switch mode power conditioning circuitry and to vary a duty cycle of the control signal to adjust the conditioning of the electrical energy using the switch mode power conditioning circuitry.

15 Claims, 12 Drawing Sheets

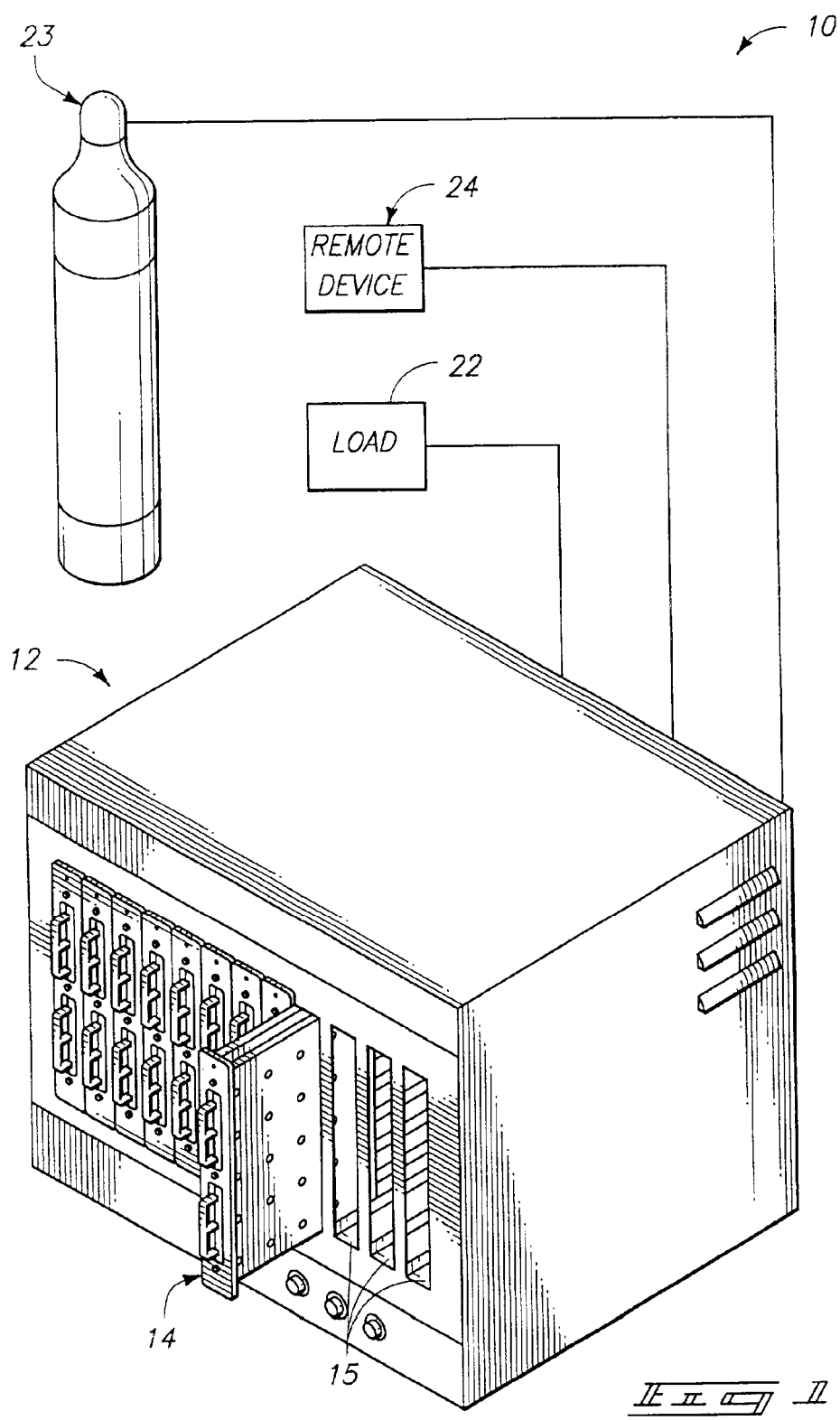

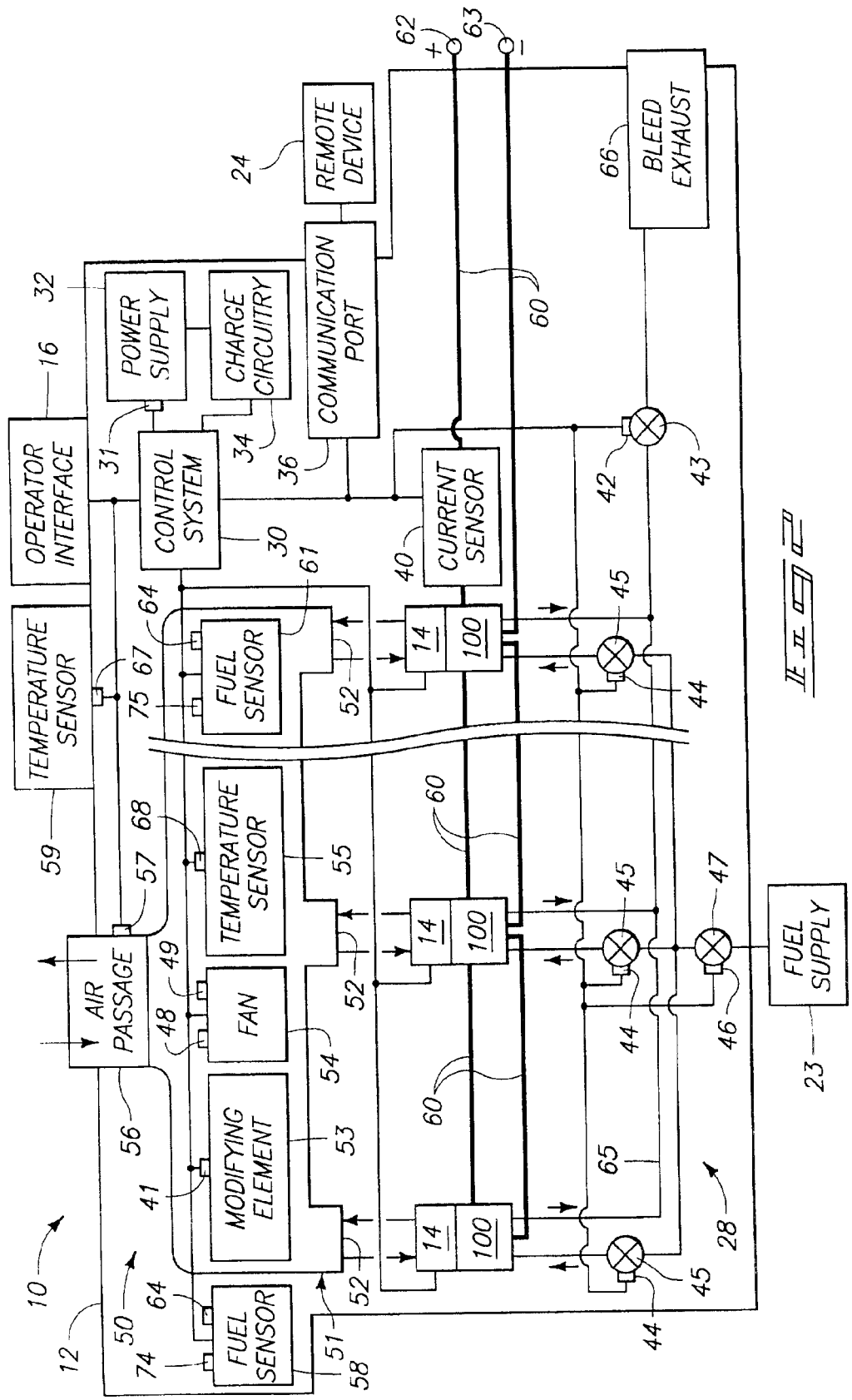

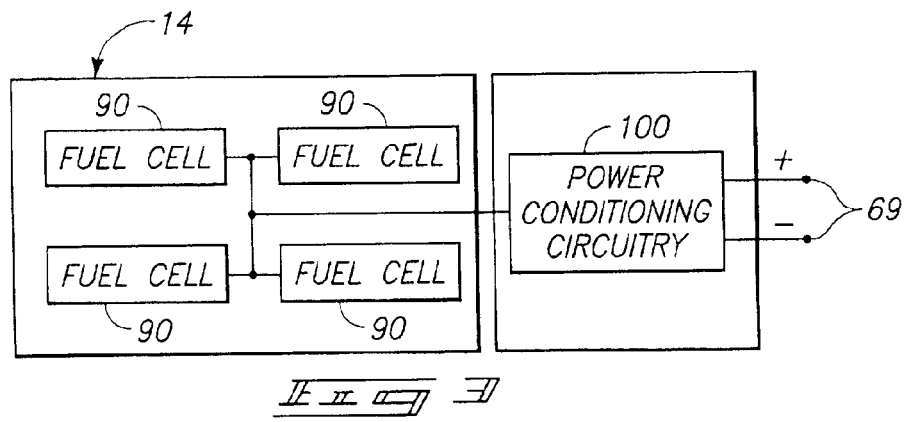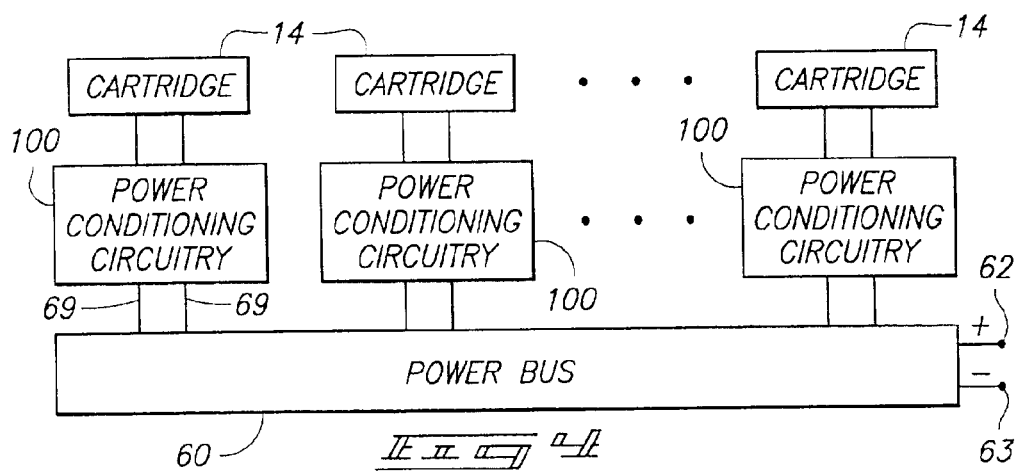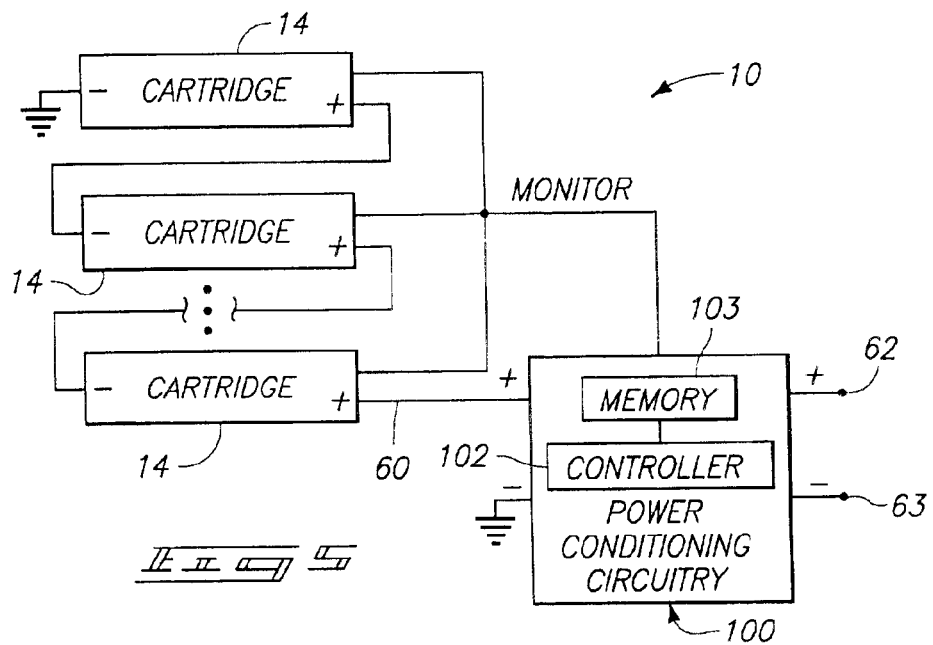

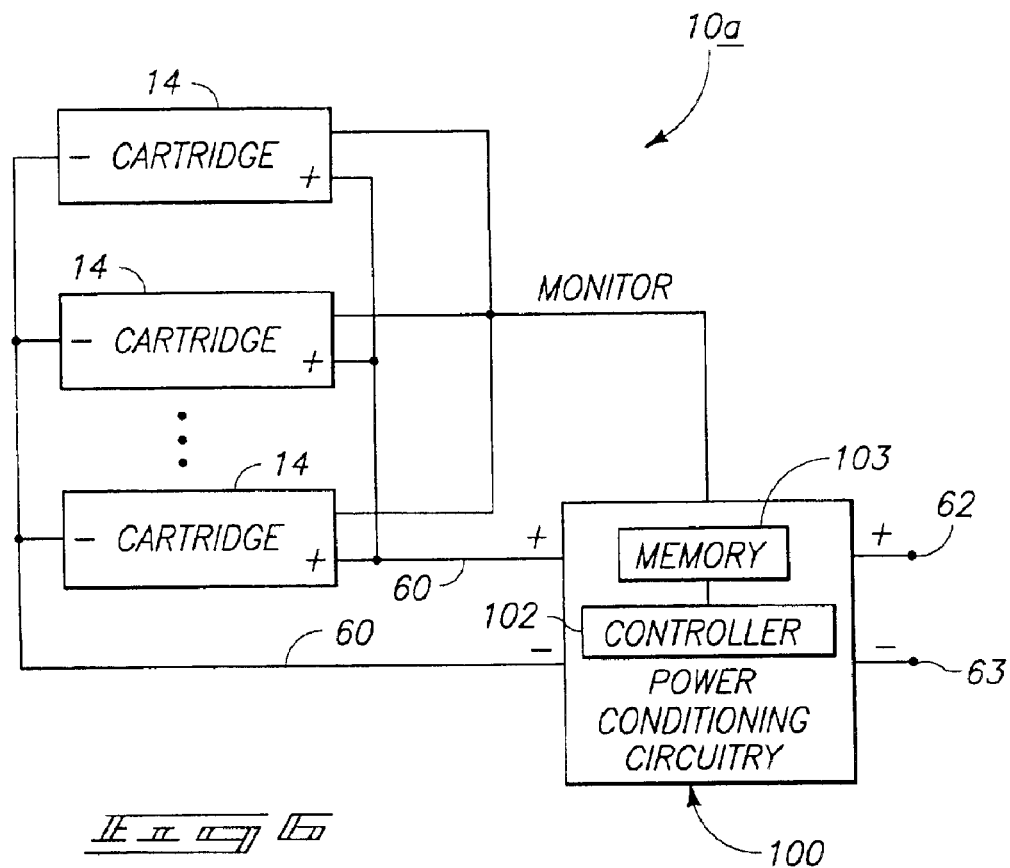
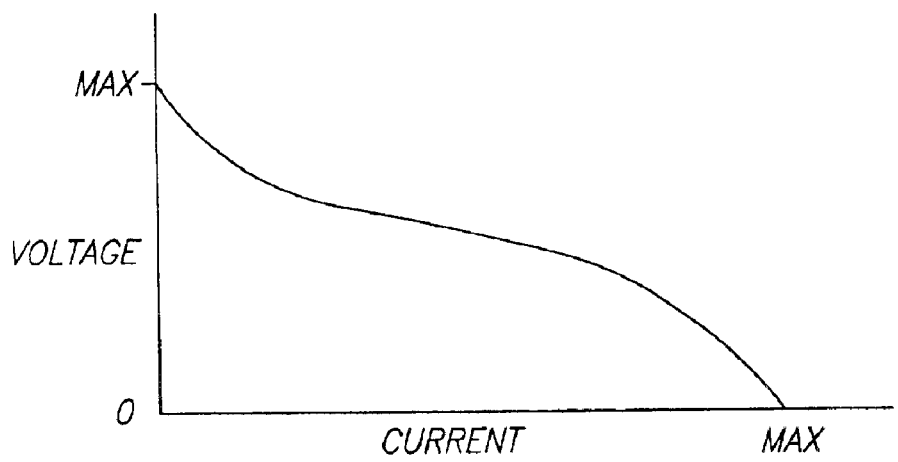

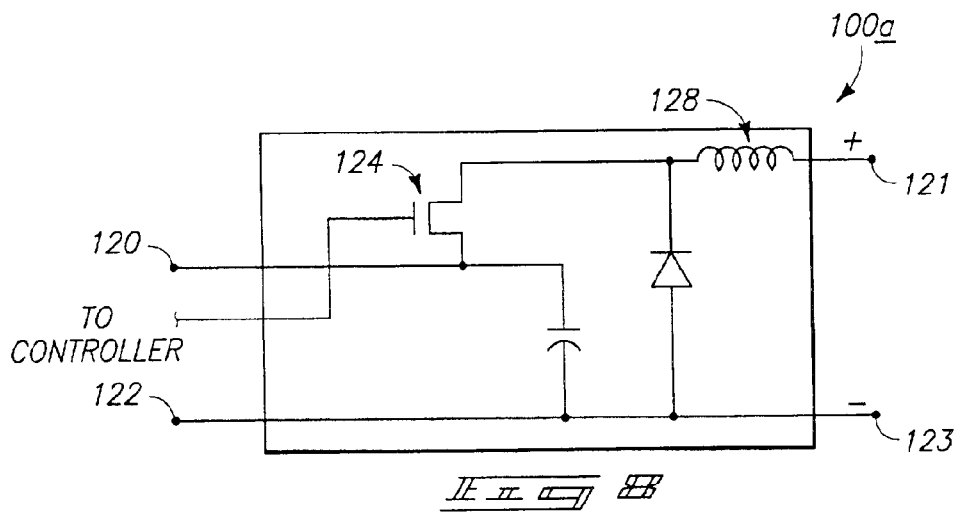
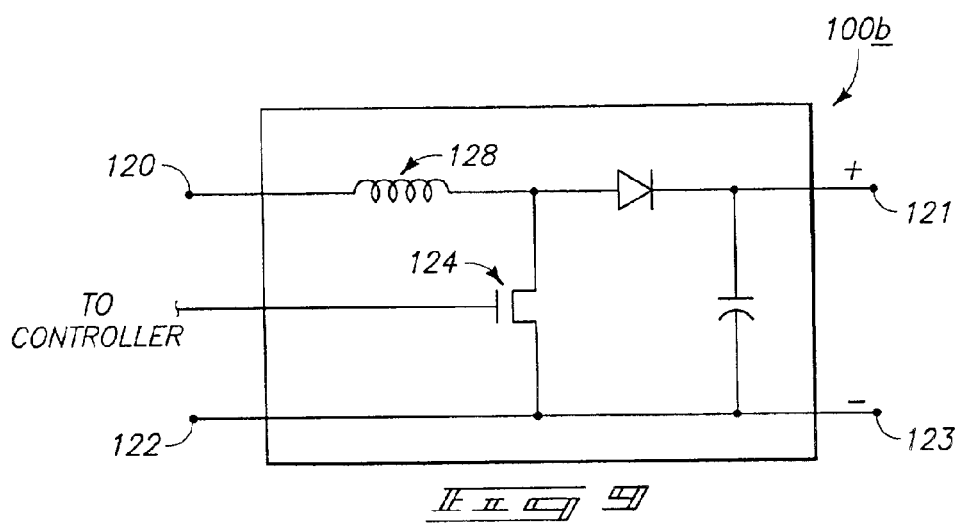
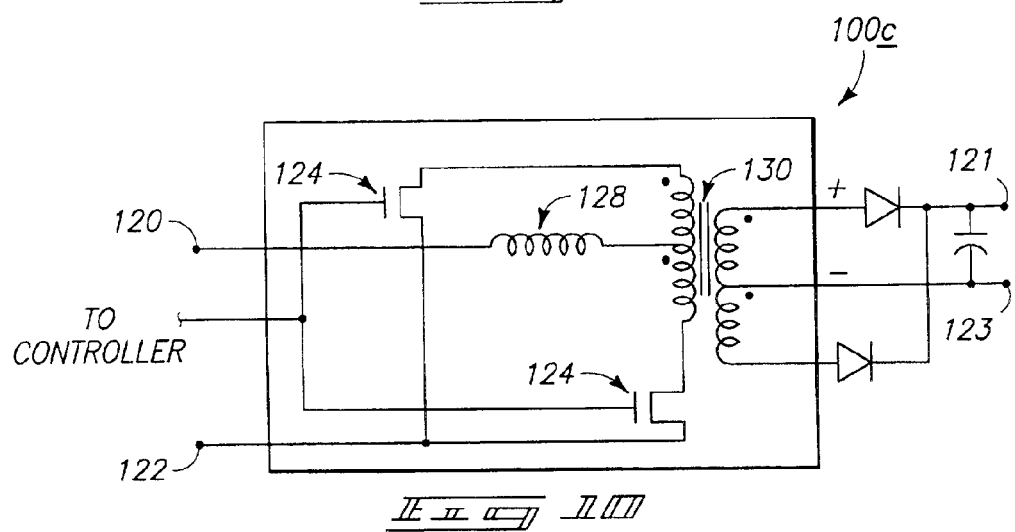

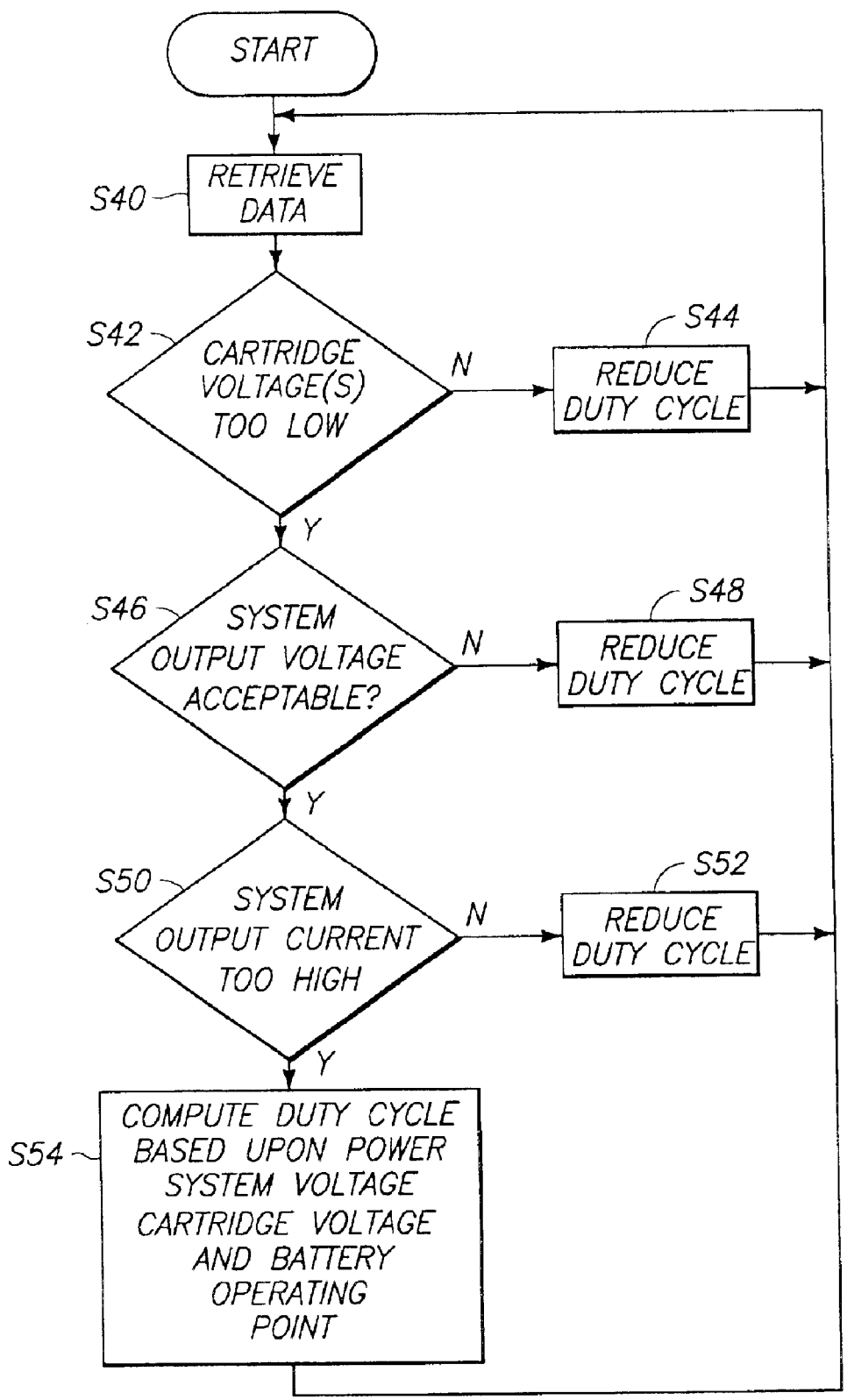

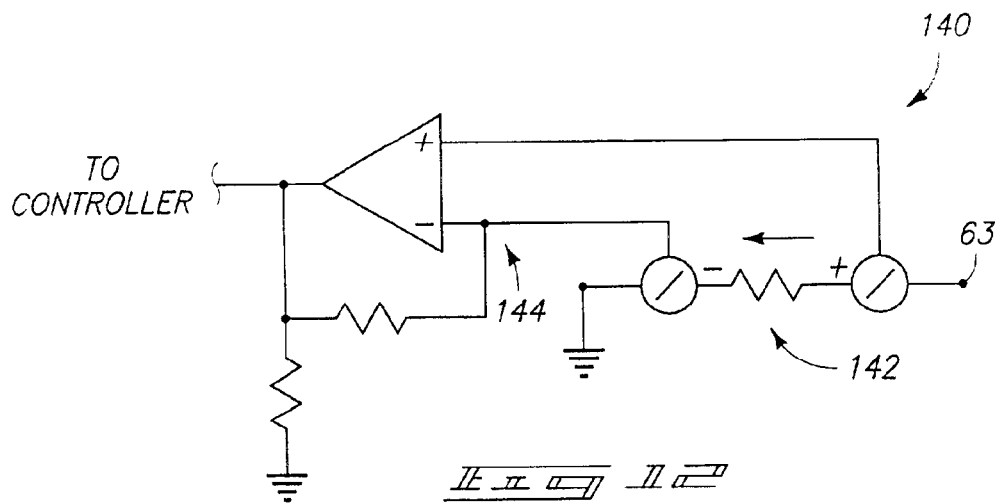
_FIG. 12_
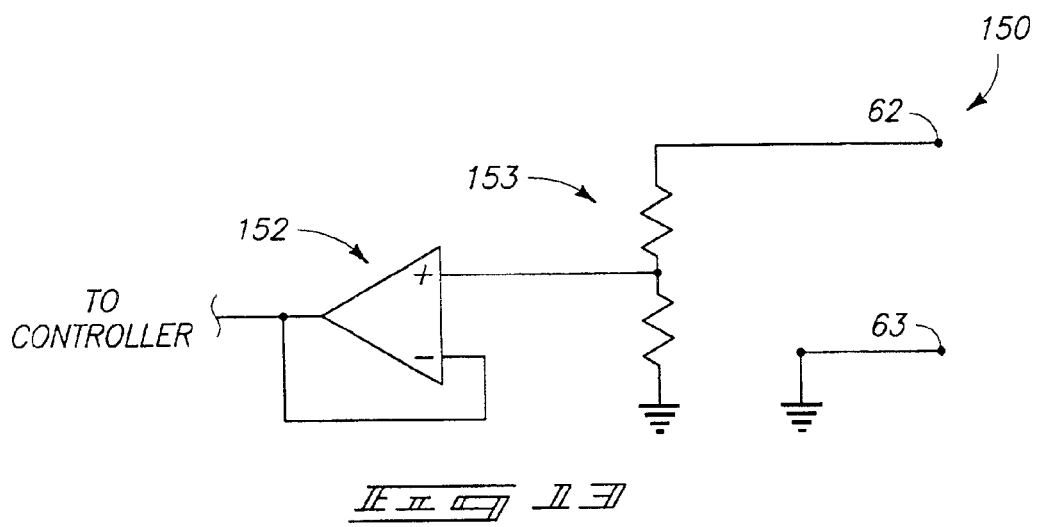
_FIG. 13_
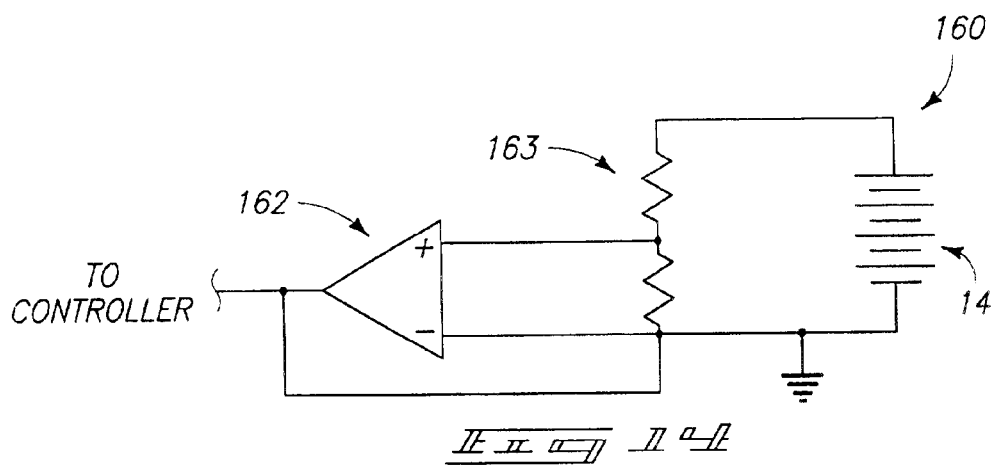
_FIG. 14_

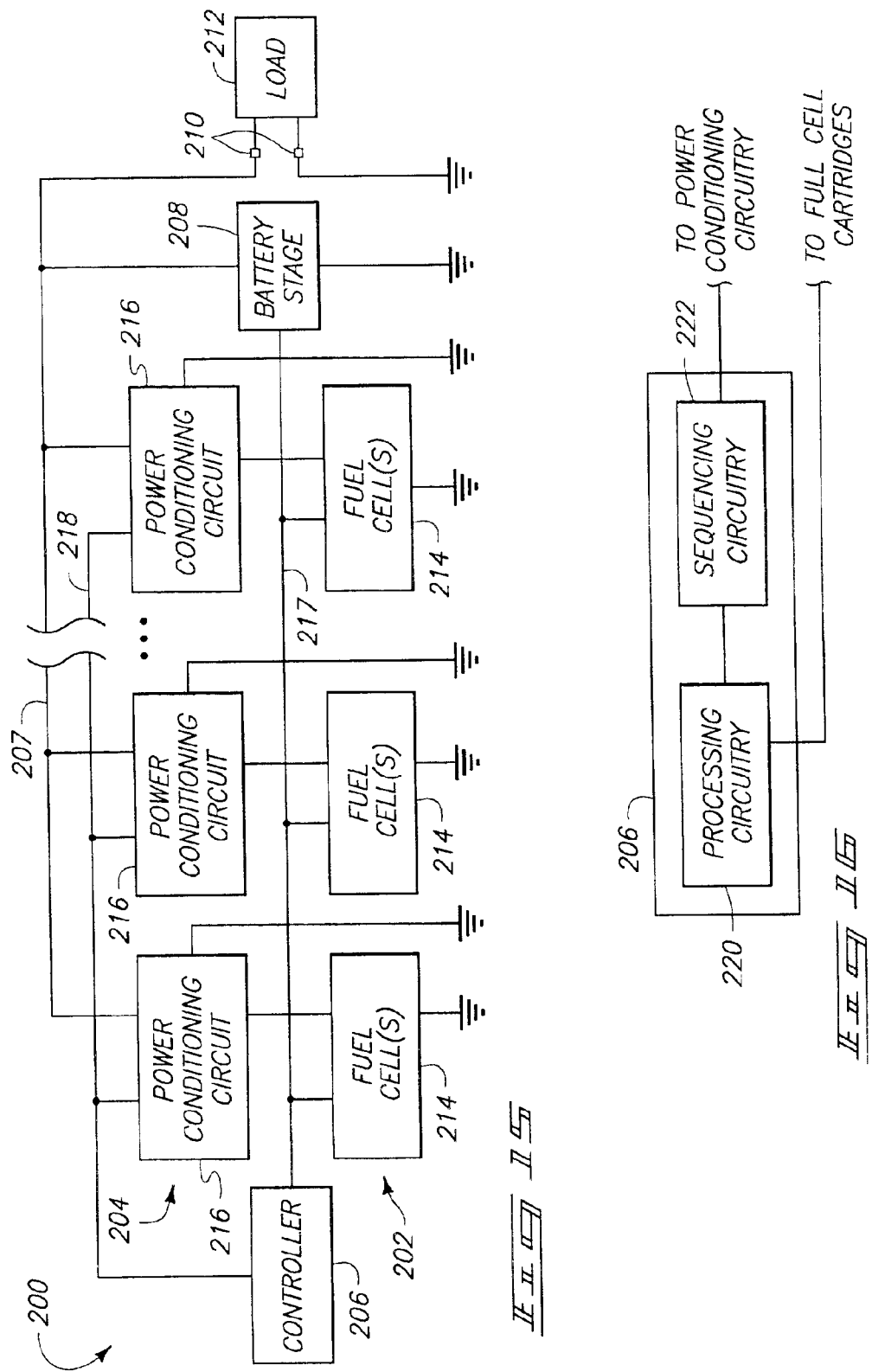

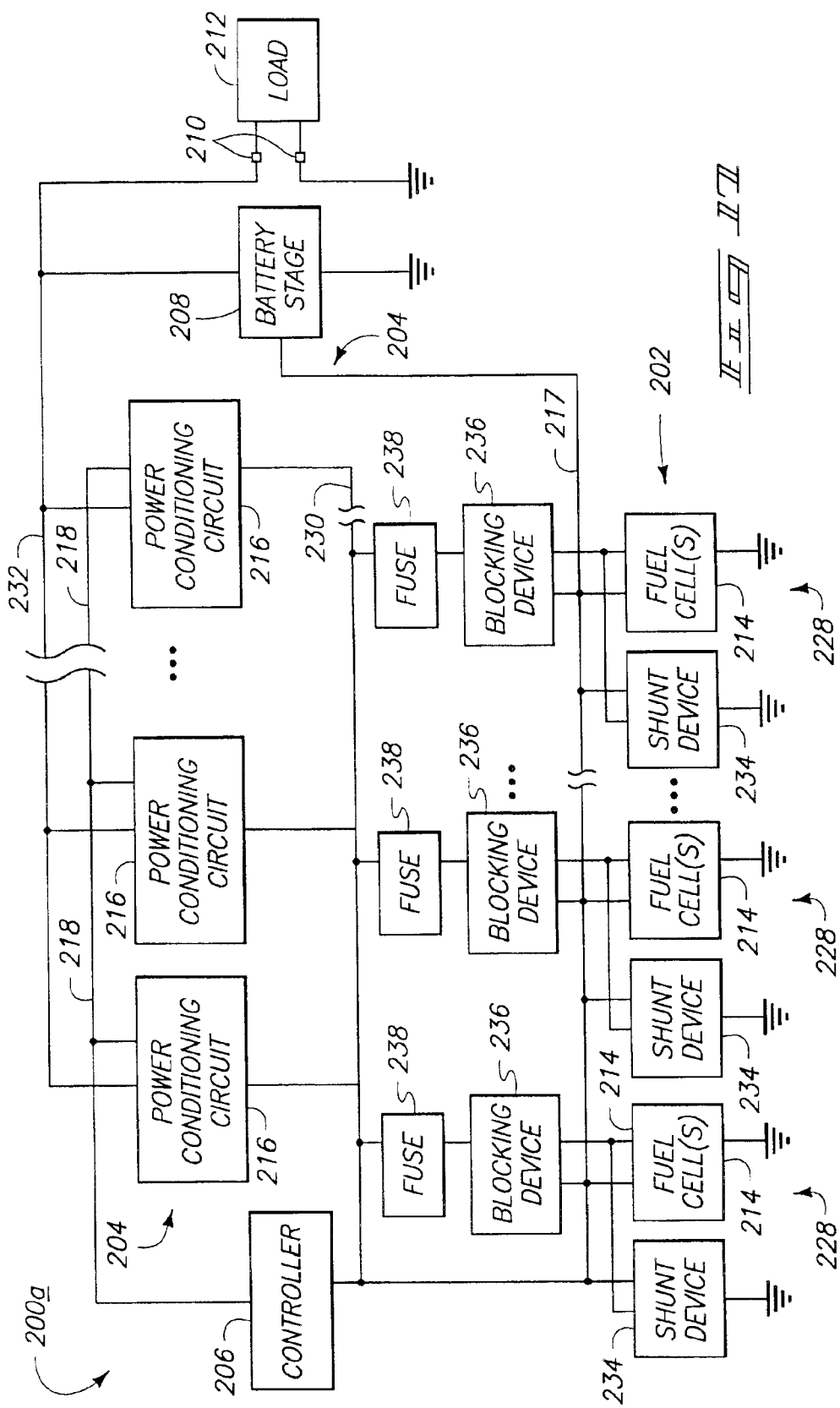

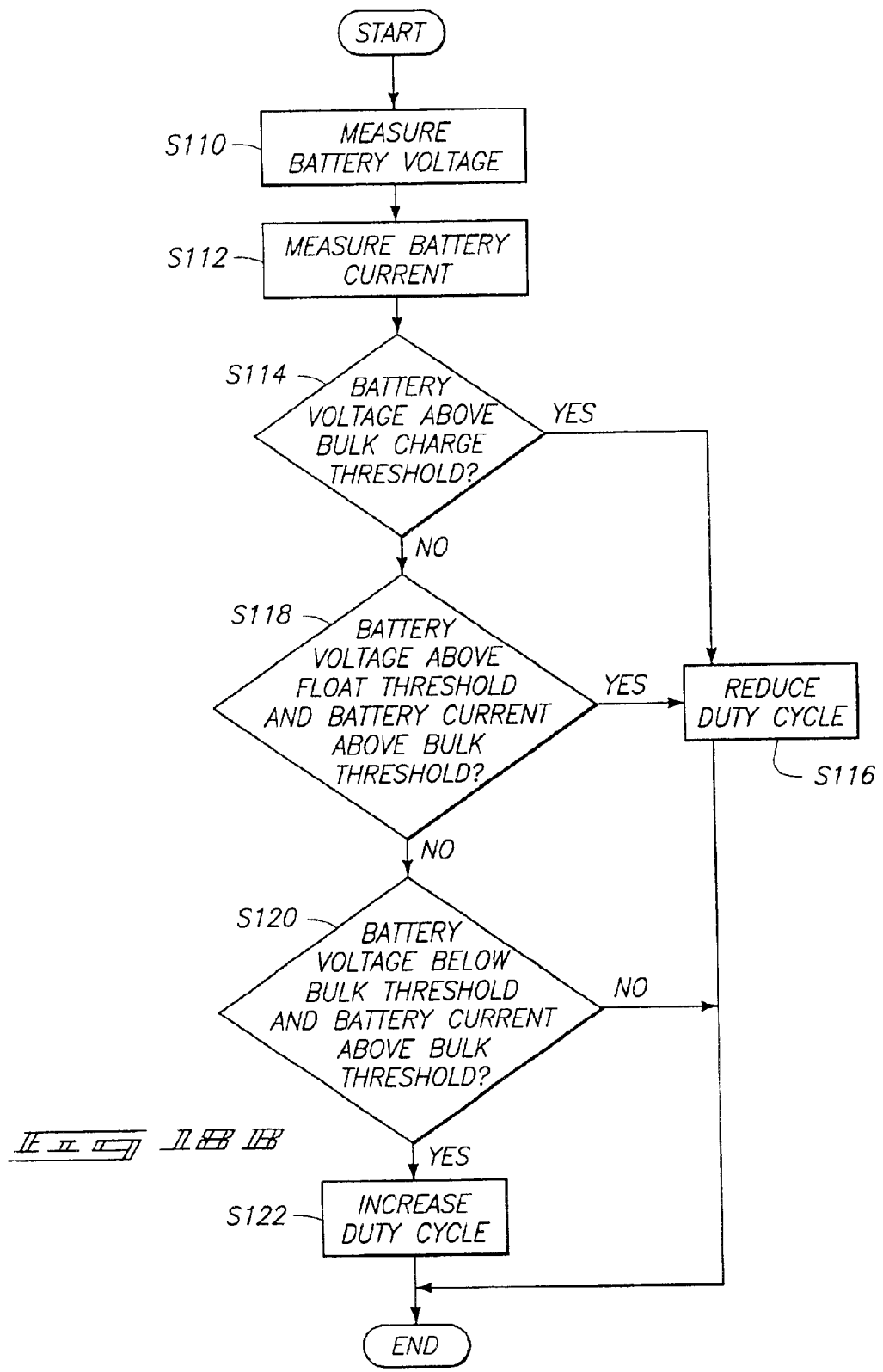

FUEL CELL POWER SYSTEMS AND METHODS OF OPERATING FUEL CELL POWER SYSTEMS

TECHNICAL FIELD

This invention relates to fuel cell power systems and methods of operating fuel cell power systems.

BACKGROUND OF THE INVENTION

Fuel cells are known in the art. The fuel cell is an electrochemical device which reacts hydrogen, and oxygen, which is usually supplied from the ambient air, to produce electricity and water. The basic process is highly efficient and fuel cells fueled directly by hydrogen are substantially pollution free. Further, since fuel cells can be assembled into stacks of various sizes, power systems have been developed to produce a wide range of electrical power output levels and thus can be employed in numerous applications.

Fuel cell power systems which need an energy buffer for occasional load surges can utilize batteries to supply energy needs which exceed the energy production capacity of a fuel cell. The output of one of more fuel cells can be coupled to one or more batteries, which provide energy storage for handling temporary load surges.

A typical battery will have different voltage ranges depending on the state of charge of the batteries. Similarly, a battery will charge at a different rate depending on the voltage of the battery when power is flowing into it. Careful management of the state of charge of a battery is important to insure long battery life and optimal battery performance.

In a fuel cell power system, fuel cells produce power, a load will consume power, and a battery will act as a temporary energy buffer. Because the current-voltage curve of a fuel cell can vary widely with load, the output voltage of a fuel cell may not be well-matched to the battery voltage in many instances.

In addition, it is important to prevent fuel cells from overloading by pulling the voltage of a fuel cell too low at high power draw. A further problem is a need to provide DC to DC conversion to a commercially useful voltage. More particularly, fuel cells may produce a voltage that is too low for industrial application, and DC to DC conversion to a higher voltage is desirable.

The invention described below seeks to overcome these problems.

BRIEF DESCRIPTION OF THE DRAWINGS

Preferred embodiments of the invention are described below with reference to the following accompanying drawings.

FIG. 1 is a perspective view of an exemplary fuel cell power system according to the present invention.

FIG. 2 is an illustrative representation of components of the fuel cell power system.

FIG. 3 is a functional block diagram of an exemplary fuel cell cartridge.

FIG. 4 is a functional block diagram of an exemplary fuel cell power system depicting modular concepts in accordance with aspects of the present invention.

FIG. 5 is a functional block diagram illustrating plural fuel cell cartridges coupled in series with power conditioning circuitry.

FIG. 6 is a functional block diagram illustrating plural fuel cell cartridges coupled in parallel with power conditioning circuitry.

FIG. 7 is a characteristic voltage/current curve of the depicted fuel cell power system.

FIG. 8 is a schematic representation of a second configuration of power conditioning circuitry comprising DC—DC converter circuitry.

FIG. 9 is a schematic representation of another configuration of power conditioning circuitry comprising DC—DC converter circuitry.

FIG. 10 is a schematic representation of another configuration of power conditioning circuitry comprising DC—DC converter circuitry.

FIG. 12 is a schematic representation of an exemplary current sensing circuit.

FIG. 13 is a schematic representation of an exemplary voltage sensing circuit.

FIG. 14 is a schematic representation of another exemplary voltage sensing circuit.

FIG. 15 is a functional block diagram of an exemplary fuel cell power system according to an alternative embodiment.

FIG. 16 is a functional block diagram of an exemplary controller of a fuel cell power system.

FIG. 17 is a functional block diagram of another exemplary fuel cell power system according to yet another alternative embodiment.

FIG. 18A is a flow chart depicting an exemplary methodology for controlling fuel cells of the fuel cell power systems depicted in FIGS. 15 and 17.

FIG. 18B is a flow chart depicting an exemplary methodology for controlling fuel cells of the fuel cell power systems depicted in FIGS. 15 and 17 to implement exemplary battery maintenance operations.

DETAILED DESCRIPTION OF THE PREFERRED EMBODIMENTS

Figure 11B:
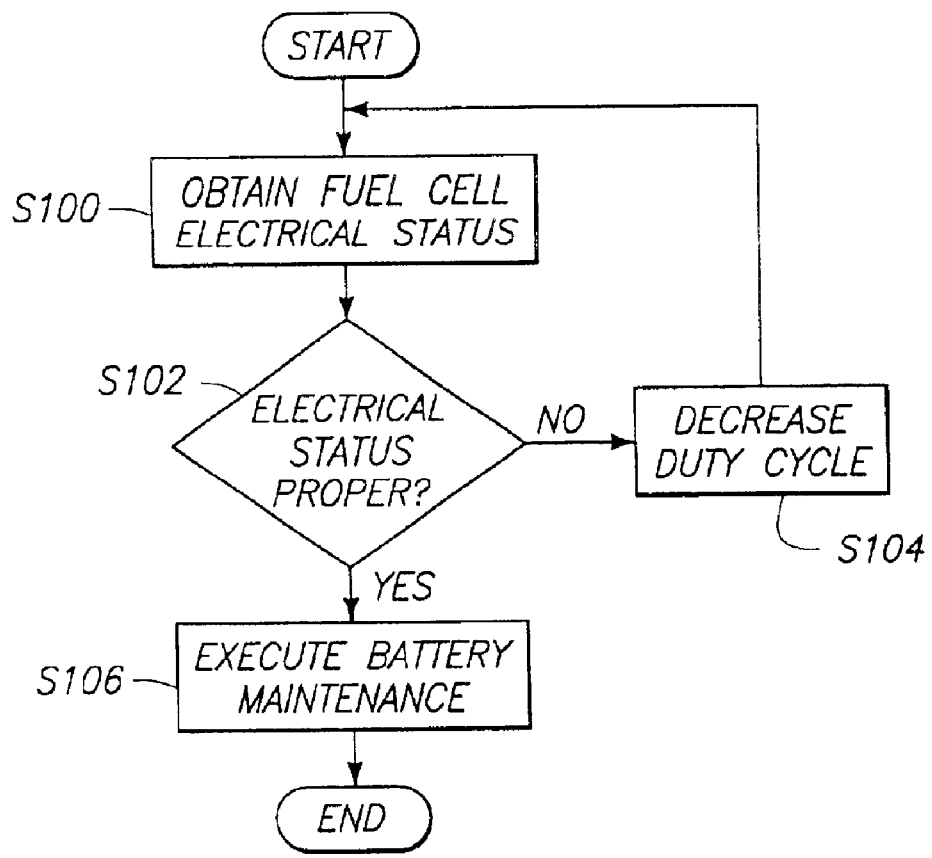
FIG. 11 is a flow chart illustrating exemplary control operations of the power conditioning circuitry of FIG. 10 and FIG. 11.

This disclosure of the invention is submitted in furtherance of the constitutional purposes of the U.S. Patent Laws "to promote the progress of science and useful arts" (Article 1, Section 8).

According to one aspect of the present invention, a fuel cell power system comprises a fuel cell configured to generate electrical energy; switch mode power conditioning circuitry configured to electrically condition the electrical energy generated by the fuel cell, wherein the switch mode power conditioning circuitry; and a controller configured to monitor an electrical status of the fuel cell and to adjust the conditioning of the electrical energy using the switch mode power conditioning circuitry responsive to the monitoring, wherein the controller is configured to provide a pulse width modulated control signal to control the switching of the switch mode power conditioning circuitry and to vary a duty cycle of the control signal to adjust the conditioning of the electrical energy using the switch mode power conditioning circuitry, to regulate the operating point of the fuel cell.

Another aspect of the invention provides a fuel cell power system comprising a plurality of fuel cells configured to generate electrical energy; switch mode power conditioning circuitry comprising an electrical energy storage device and a switch, wherein the switch mode power conditioning circuitry is electrically coupled to each fuel cell and configured to electrically condition the electrical energy generated by the fuel cells; and a controller configured to monitor an electrical status of at least one of the fuel cells and to adjust the conditioning of electrical energy using the switch mode power conditioning circuitry responsive to the monitoring, wherein the controller is configured to provide a pulse width modulated control signal to control the switching and to vary a duty cycle of the control signal to adjust the conditioning of the electrical energy using the switch mode power conditioning circuitry, to regulate the operating point of the fuel cell.

Another aspect of the invention provides a fuel cell power system comprising: a plurality of fuel cells configured to generate electrical energy; a plurality of switch mode power conditioning circuits respectively comprising an electrical energy storage device and a switch, wherein each switch mode power conditioning circuit is electrically coupled to one of the fuel cells and configured to electrically condition the electrical energy generated by the fuel cell coupled thereto; and a controller configured to monitor an electrical status of at least one of the fuel cells and to adjust the conditioning of electrical energy using the switch mode power conditioning circuitry responsive to the monitoring, wherein the controller is configured to provide a pulse width modulated control signal to control the switching and to vary a duty cycle of the control signal to adjust the conditioning of the electrical energy using the switch mode power conditioning circuitry, to regulate the operating point of each fuel cell.

Another aspect of the invention provides a fuel cell power system comprising: a first bus; a second bus; a fuel cell coupled with the first bus; switch mode power conditioning circuitry coupled intermediate the first bus and the second bus and comprising a switch and an electrical energy storage device, wherein the switch mode power conditioning circuitry is configured to condition electrical energy from the first bus and the fuel cell and to provide conditioned electrical energy to the second bus; and a controller configured to provide a pulse width modulated control signal to control the switching of the switch mode power conditioning circuitry, to monitor an electrical status of the fuel cell and to vary a duty cycle of the control signal to adjust the conditioning of electrical energy using the switch mode power conditioning circuitry responsive to the monitoring.

Another aspect of the invention provides a fuel cell power system comprising: a fuel cell configured to generate electrical energy; switch mode power conditioning circuitry comprising a switch and an electrical energy storage device configured to electrically condition the electrical energy; a battery electrically coupled with the switch mode power conditioning circuitry and configured to store electrical energy; and a controller configured to monitor an electrical status comprising voltage of the battery, to provide a pulse width modulated control signal to control the switching of the switch mode power conditioning circuitry, and to vary the duty cycle of the control signal to adjust the conditioning of electrical energy using the switch mode power conditioning circuitry responsive to the monitoring to maintain the voltage of the battery within a defined range.

Another aspect of the invention provides a fuel cell power system comprising: a plurality of fuel cells; a plurality of switch mode power conditioning circuits individually including an energy storage device and a switch, the switch mode power conditioning circuits being configured to electrically condition electrical energy generated by the fuel cells; and a controller configured to provide a plurality of pulse width modulated control signals to the switch mode power conditioning circuits to control the switching devices to monitor an electrical status of the fuel cells and to vary the duty cycles of the control signals to adjust the conditioning of electrical energy using the switch mode power conditioning circuits responsive to the monitoring.

Another aspect of the invention provides a method of operating a fuel cell power system comprising: generating electrical energy using a fuel cell; conditioning the electrical energy using switch mode power conditioning circuitry comprising a switch and an electrical energy storage device; providing a pulse width modulated control signal to control the switch; monitoring an electrical status of the fuel cell; and adjusting the conditioning of the electrical energy using the switch mode power conditioning circuitry responsive to the monitoring, the adjusting comprising varying a duty cycle of the pulse width modulated control signal.

Another a method of operating a fuel cell power system comprising: generating electrical energy using a fuel cell; conditioning the electrical energy using switch mode power conditioning circuitry comprising an electrical energy storage device and a switch; providing a pulse width modulated control signal to control the switching of the switch mode power conditioning circuitry; monitoring an electrical status of the fuel cell; and adjusting the conditioning of electrical energy using the switch mode power conditioning circuitry responsive to the monitoring, the adjusting comprising adjusting a duty cycle of the control signal.

Another aspect of the invention provides a method of operating a fuel cell power system comprising: generating electrical energy using a fuel cell; receiving electrical energy within a first bus coupled with the fuel cell; conditioning the electrical energy from the first bus using a switch mode power conditioning circuit coupled in parallel with the first bus and a second bus, the switch mode power conditioning circuit including a switch and an electrical energy storage device; supplying conditioned electrical energy to a load using the second bus; providing a pulse width modulated control signal to control the switching of the switch mode power conditioning circuit; monitoring an electrical status of the fuel cell; and adjusting the conditioning of electrical energy using the switch mode power conditioning circuits responsive to the monitoring, the adjusting comprising adjusting a duty cycle of the control signal.

Another aspect of the invention provides a method of operating a fuel cell power system comprising: generating electrical energy using a fuel cell; conditioning the electrical energy using switch mode power conditioning circuitry comprising a switch and an electrical energy storage device configured to electrically condition the electrical energy; controlling the switch using a pulse width modulated control signal; storing electrical energy within a battery; monitoring a voltage of the battery; and adjusting the conditioning of the electrical energy using the switch mode power conditioning circuitry responsive to the monitoring of the voltage of the battery, the adjusting comprises increasing a duty cycle of the control signal responsive to the voltage of the battery being below a first threshold and decreasing the duty cycle responsive to the voltage of the battery being above a second threshold; and providing electrical energy from the switch mode power conditioning circuitry and the battery to a load.

Another aspect of the invention provides a method of operating a fuel cell power system comprising: generating electrical energy using a plurality of fuel cells; conditioning the electrical energy of the fuel cells using a plurality of switch mode power conditioning circuits individually including an electrical energy storage device and a switch; and providing a plurality of control signals to the switch mode power conditioning circuits during a switching period to control the respective switches, wherein the providing the control signals comprises applying the control signals to the switch mode power conditioning circuits at different moments in time during the switching period.

Referring to FIG. 1, one configuration of an ion exchange membrane fuel cell power system 10 is illustrated. The depicted configuration of fuel cell power system 10 is exemplary and other configurations are possible. As shown, fuel cell power system 10 includes a housing 12 releasably supporting a plurality of hand manipulable fuel cell cartridges 14. Housing 12 defines a subrack assembly in one embodiment.

A plurality of individual module apertures 15 are formed in the front of the principal housing 12, and are operable to individually receive the respective fuel cell modules 14, and position them in predetermined spaced relation, one to the other.

The fuel cell power system is configured in a manner where at least one of the fuel cell modules 14 can be easily removed from at least one of the subracks by hand, while the remaining modules continue to operate. This removal is normally accomplished without the use of any tools, however it may be necessary in some commercial or industrial applications where vibration, and other outside physical forces may be imparted to the system, to use threaded fasteners and the like to releasably secure the individual modules to the subrack to prevent the unintentional displacement or dislocation of the respective modules from the subrack. If utilized, the hand tools which will be employed will be simple hand tools, and the removal will be accomplished in minutes, as opposed the prior art stack arrangements where replacement of a damaged membrane electrode assembly (MEA) may take hours to accomplish.

Each fuel cell cartridge 14 includes a plurality of membrane-electrode assemblies (MEAs). One fuel cell power system is described in detail in U.S. patent application Ser. No. 09/577,407, now U.S. Pat. No. 6,468,682, titled Ion Exchange Membrane Fuel Cell, and Ion Exchange Membrane Fuel Cell Power System, naming as inventors William A. Fuglevand, Peter D. DeVries, Greg A. Lloyd, David R. Lott, and John P. Scartozzi, and incorporated by reference herein.

Fuel cell power system 10 is shown coupled with a remote device 24. Fuel cell power system 10 is preferably configured to communicate with remote device 24. An exemplary remote device 24 comprises an off-site control and monitoring station. Fuel cell power system 10 receives communications from remote device 24 which may comprise data and commands. Fuel cell power system 10 is also configured to output data, requests, etc. to remote device 24.

Referring to FIG. 2, some components of fuel cell power system 10 are shown. The components are internal and external of housing 12 of fuel cell power system 10. Internally, only three fuel cell cartridges 14 are shown in FIG. 2 for simplicity. More fuel cell cartridges 14 are provided in typical configurations.

The fuel cell power system 10 shown in FIG. 2 further includes a control system 30. One configuration of control system 30 is described below in detail. The illustrated control system 30 is coupled with a power supply sensor 31 associated with a power supply 32, and charge circuitry 34. Control system 30 is additionally coupled with fuel cell cartridges 14 and operator interface 16. Further, control system 30 is coupled with a communication port 36, switching device 38 and current sensor 40. Control system 30 is additionally coupled with a bleed solenoid 42 associated with a bleed valve 43. Other embodiments may include multiple bleed solenoids associated with multiple bleed valves.

The depicted fuel cell power system 10 includes a fuel delivery system 28. Fuel delivery system 28 couples with a fuel supply 23 to supply fuel to fuel cell cartridges 14. Exemplary fuel comprises hydrogen gas in the described embodiment. Other fuels may be possible.

The depicted fuel delivery system 28 includes a main valve 47 and plural auxiliary valves 45 associated with respective fuel cell cartridges 14. Main valve 47 controls the flow of fuel from fuel supply 23 into fuel cell power system 10. Auxiliary valves 45 control the flow of fuel to respective fuel cell cartridges 14. Control system 30 is coupled with plural auxiliary solenoids 44 of associated auxiliary valves 45. Control system 30 is further coupled with a main solenoid 46 of associated main valve 47.

The depicted fuel cell power system 10 includes an air temperature control assembly 50. The illustrated air temperature control assembly 50 includes a plenum 51 having associated ports 52 corresponding to fuel cell cartridges 14. Within plenum 51 of air temperature control assembly 50, a temperature modifying element 53, fan 54, temperature sensor 55 and fuel sensor 61 are provided.

A controllable airflow device or air passage 56 couples plenum 51 to exterior ambient air outside of housing 12. Air passage 56 can permit the intake of air into plenum 51 as well as the exhaustion of air from plenum 51. Control system 30 is coupled with control circuitry 51 of modifying element 53, control circuitry 48 and monitoring circuitry 49 of fan 54, temperature circuitry 68 associated with temperature sensor 55, control circuitry 57 of air passage 56, and heater 75 of fuel sensor 61.

A first fuel sensor 58 is provided within housing 12 and outside of plenum 51 as shown. First fuel sensor 58 is operable to monitor for the presence of fuel within housing 12. A second fuel sensor 61 is provided within plenum 51 to monitor for the presence of fuel within plenum 51. Control system 30 is configured to couple with fuel detection circuitry 64 associated with fuel sensors 58, 61. Fuel detection circuitry 64 can condition measurements obtained from sensors 58, 61.

Heaters 74, 75 are coupled with respective fuel sensors 58, 61 to provide selective heating of fuel sensors 58, 61 responsive to control from control system 30. Heaters 74, 75 are integral of fuel sensors 58, 61 in some configurations. An exemplary fuel sensor configuration with an integral heater has designation TGS 813 available from Figaro Engineering, Inc. Such heaters are preferably provided in a predefined temperature range to assure proper operation. Other configurations of sensors 58, 61 are possible.

An external temperature sensor 59 is provided outside of housing 12 in one embodiment. Control system 30 is also coupled with temperature circuitry 67 associated with temperature sensor 59 to monitor the exterior temperature. Temperature circuitry 67 conditions signals received from temperature sensor 59.

Control system 30 is configured to at least one of control and monitor at least one operation of fuel cell power system 10. During operation, fuel from fuel supply 23 is applied to main valve 47. Main valve 47 is coupled with auxiliary valves 45 as shown. Responsive to control from control system 30, main valve 47 and auxiliary valves 45 apply fuel to respective fuel cell cartridges 14. Responsive to the supply of fuel, and in the presence of oxygen, fuel cell cartridges 14 produce electrical power.

In one embodiment, power conditioning circuitry 100 is coupled to each fuel cell cartridge 14. A power bus 60 couples each of the power conditioning circuits 100. Power bus 60 provides an electrical connection which is coupled with external terminals 62, 63 which may be connected with an external load 22 (shown in FIG. 1). Terminal 62 provides a positive terminal and terminal 63 provides a negative terminal of fuel cell power system 10.

Air temperature control assembly 50 applies oxygen to the respective fuel cell cartridges 14 via ports 52. Fuel cell cartridges 14 are individually operable to convert chemical energy into electricity. As described below, fuel cartridges 14 individually contain plural fuel cells individually having an anode side and a cathode side. Auxiliary valves 45 apply fuel to the anode sides of the fuel cells. Plenum 51 directs air within the cathode sides of the fuel cells.

Air temperature control assembly 50 preferably provides circulated air within a predetermined temperature range. Such circulated air can be exterior air and/or recirculated air. In the preferred embodiment, air temperature control assembly 50 provides air within plenum 51 within an approximate temperature range of 25° Celsius to 80° Celsius.

Upon start-up conditions of fuel cell power system 10, modifying element 53 may be controlled via control system 30 using element control circuitry 41 to either increase or decrease the temperature of air present within plenum 51. Fan 54 operates to circulate the air within plenum 51 to respective fuel cell cartridges 14. Fan control circuitry 48 and fan monitor circuitry 49 are shown coupled with fan 54. Responsive to control from control system 30, fan control circuitry 48 operates to control air flow rates (e.g., speed of rotation) of fan 54. Fan monitor circuitry 49 operates to monitor the actual airflow rates induced by fan 54 (e.g., circuitry 49 can comprise a tachometer for rotational fan configurations).

Control system 30 monitors the temperature of the air within plenum 51 using temperature sensor 55. During operation, heat is generated and emitted from fuel cell cartridges 14. Thus, it may be necessary to decrease the temperature of air within plenum 51 to provide efficient operation of fuel cell power system 10. Responsive to control from control system 30, air passage 56 can be utilized to introduce exterior air into plenum 51 and exhaust air from plenum 51 to ambient.

Control system 30 communicates with control circuitry 57 to control air passage 56. In one embodiment, air passage 56 includes a plurality of vanes and control circuitry 57 operates to control the position of the vanes of air passage 56 to selectively introduce exterior air into plenum 51. The vanes of air passage 56 can preferably be provided in a plurality of orientations between an open position and a closed position to vary the amount of exterior fresh air introduced into plenum 51 or the amount of air exhausted from plenum 51 responsive to control from control system 30. Air circulated within plenum 51 can comprise recirculated and/or fresh ambient air.

Utilizing temperature sensor 59, control system 30 can also monitor the temperature of ambient air about housing 12. Control system 30 can utilize such exterior temperature information from temperature sensor 59 to control the operation of air passage 56. Temperature sensor 59 is located adjacent air passage 56 in a preferred embodiment.

As described in further detail below, control system 30 controls airflow rates of fan 54 using fan control circuitry 48. Fan monitor circuitry 49 provides air flow rate information to control system 30. Control system 30 can monitor the total system voltage being delivered via power bus 60. Control system 30 can also monitor the electrical load being delivered via power bus 60 using current sensor 40. With knowledge of the system bus voltage and load, control system 30 can calculate waste thermal power and provide a desired cooling air flow.

More specifically, the efficiency of one or more fuel cells may be determined by dividing the respective fuel cell voltage by 1.23 (a theoretical maximum voltage of a single fuel cell). An average efficiency can be determined for fuel cells 90 of fuel cell power system 10. The remaining energy (energy not associated to electricity) as determined from the efficiency calculation is waste thermal power. The determined waste thermal power may be utilized to provide a desired cooling air flow. Control system 30 controls the air flow rates of fan 54 depending upon the waste thermal power in accordance with one aspect of the described fuel cell power system 10.

During operation of fuel cell cartridges 14, non-fuel diluents such as cathode-side water and atmospheric constituents can diffuse from the cathode side of the fuel cell through a membrane electrode assembly of the fuel cell and accumulate in the anode side of the fuel cell. In addition, impurities in the fuel supply delivered directly to the anode side of the fuel cell also accumulate. Without intervention, these diluents can dilute the fuel sufficiently enough to degrade performance. Accordingly, the anode side of the individual fuel cells is connected to a bleed manifold 65. Bleed manifold 65 is additionally coupled with bleed valve 43.

Control system 30 selectively operates bleed solenoid 42 to selectively open and close bleed valve 43 permitting exhaustion of matter such as entrained diluents and perhaps some fuel via a bleed exhaust 66 within housing 12. Control system 30 can operate to open and close bleed valve 43 on a periodic basis. The frequency of openings and closings of bleed valve 43 can be determined by a number of factors, such as electrical load coupled with terminals 62, 63, etc. Although not shown, a fuel recovery system may be coupled with bleed exhaust 66 to retrieve unused fuel for recirculation or other uses.

For example, control system 30 may verify when an appropriate operational temperature within plenum 51 has been reached utilizing temperature sensor 55. In addition, control system 30 can verify that at least one electrical characteristic, such as voltage and/or current, of respective fuel cell cartridges 14 has been reached before enabling the power conditioning circuits 100 to provide power to power bus 60.

Power supply 32 includes power supplies having different voltage potentials in the described embodiment. For example, power supply 32 can provide a 5 Volt supply voltage for operating the digital circuitry of fuel cell power system 10, such as control system 30. Power supply 32 can also provide higher voltage potentials, such as +/−12 Volts for operation of components such as fan 54 within fuel cell power system 10.

Further, power supply 32 can include a battery powering components during start-up procedures. Following start-up procedures, power supply 32 can be coupled with power bus 60 and internal power utilized by fuel cell power system 10 can be derived from electrical power generated from fuel cell cartridges 14. Charge circuitry 34 is provided to selectively charge batteries of power supply 32 utilizing power from power bus 60. Control system 30 is configured to monitor electrical conditions of the batteries and the supplied voltages of power supply 32 using power supply sensors 31. Control system 30 can operate charge circuitry 34 to charge batteries of power supply 32 depending upon such monitoring operations.

Control system 30 is also coupled with communication port 36 providing communications to an external device such as a remote device 24. An exemplary remote device 24 comprises an external control system or monitoring system off-site from fuel cell power system 10. Control system 30 can output data including requests, commands, operational conditions, etc., of fuel cell power system lousing communication port36. In addition, control system 30 can receive data including commands, requests, etc., from remote device 24 using communication port 36. Additional details of control system 30 are described in U.S. patent application Ser. No. 09/322,666, filed May 28, 1999, now U.S. Pat. No. 6,387,556, entitled Fuel Cell Power Systems and Methods of Controlling a Fuel Cell Power System, naming William A. Fuglevand, P. E., Dr. Shiblihanna I. Bayyuk, Ph.D., Greg A. Lloyd, Peter D. Devries, David R. Lott, and John P. Scartozzi as inventors, assigned to the assignee hereof, and incorporated herein by reference.

Power conditioning circuits 100 are illustrated coupled with bus 60 in the configuration depicted in FIG. 2. Power conditioning circuitry 100 is configured to receive and condition direct current electrical energy received from fuel cells within cartridges 14. Such conditioning of the electrical energy is described in detail below. Power conditioning circuitry 100 is provided within respective cartridges 14 to condition the electrical energy applied to bus 60 in some configurations (e.g., cartridge 14 in FIG. 3 and FIG. 4). Alternatively, power conditioning circuitry 100 is implemented externally of fuel cell cartridges 14.

Referring to FIG. 3, an exemplary fuel cell cartridge 14 comprises one or more fuel cells 90 coupled with power conditioning circuitry 100. Fuel cells 90 may be coupled in either series or parallel with power conditioning circuitry 100. Power conditioning circuitry 100 is coupled with contacts 69 to provide electrical coupling of fuel cells 90 with bus 60. Exemplary power conditioning circuitry 100 comprises a controller and memory described below. Other configurations are possible.

In one embodiment, the fuel cell cartridge 14 includes internal power conditioning circuitry. Alternatively, the power conditioning circuitry 100 is provided external of fuel cell cartridges 14 inside or outside of housing 12 of the fuel cell power system 10. Power conditioning circuitry 100 external of fuel cell cartridges 14 is shown in FIG. 2, for example. Some configurations provide power conditioning circuitry 100 both within individual fuel cell cartridges 14 and external of fuel cell cartridges 14 and coupled with terminals 62, 63.

External power conditioning circuitry 100 provided within housing 12 conditions electrical energy within bus 60 coupled with terminals 62, 63. Internal power conditioning circuitry 100 within fuel cell cartridges 14 provides conditioning of electrical energy supplied by respective fuel cell cartridges 14 to bus 60. The particular configuration of fuel cell power system 10 depends upon the particular application and design choice of a user, designer, etc.

Referring to FIG. 4, one exemplary power system implementation is illustrated. The fuel cell power system comprises a plurality of cartridges 14 which individually include one or more fuel cell (not shown in FIG. 4), plural power conditioning circuits 100, and power bus 60. As shown, power conditioning circuits 100 are depicted intermediate power bus 60 and respective fuel cell cartridges 14 (including the fuel cells). The illustrated power conditioning circuits 100 correspond to respective fuel cell cartridges 14 in the depicted embodiment.

Power conditioning circuits 100 are configured to condition electrical energy from respective fuel cell cartridges 14. For example, power conditioning circuits 100 are configured to increase the voltage potential, decrease the voltage potential, or provide a predetermined output voltage potential.

The couplings of power conditioning circuits 100 and power bus 60 are arranged in one configuration to provide power conditioning circuits 100 in parallel with terminals 62, 63. Such provides fuel cell cartridges 14 in parallel with terminals 62, 63. Alternatively, the couplings of power conditioning circuits 100 provide fuel cell cartridges 14 in series with terminals 62, 63.

Referring to FIG. 5, the depicted fuel cell cartridges 14 are illustrated coupled in series to bus 60. Bus 60 is additionally coupled with power conditioning circuitry 100 external of fuel cell cartridges 14. More specifically, power conditioning circuitry 100 is provided intermediate fuel cell cartridges 14 and terminals 62, 63 in the depicted configuration.

The illustrated embodiment of power conditioning circuitry 100 includes an internal controller 102 coupled with memory 103. A suitable controller 102 is available as a microprocessor having product designation 68HC912B32 from Motorola, Inc. Such a controller 102 is configured to provide pulse width modulation (PWM) of control signals according to certain aspects of the present invention. Other control configurations are utilized in other embodiments of the invention.

As described in detail below, controller 102 is configured according to some aspects of the present invention to monitor operational parameters of fuel cell power system 10 and to control power conditioning circuitry 100 responsive to such monitoring. For example, controller 102 is coupled with individual respective fuel cell cartridges 14 and is configured to monitor at least one operational parameter thereof. Controller 102 controls power conditioning circuitry 100 responsive to such monitoring in the described embodiment.

Controller 102 is configured to monitor voltages and currents within fuel cell cartridges 14 according to certain aspects of the present invention. According to other aspects of the invention, controller 102 is configured to monitor other operational parameters of fuel cell power system 10, such as temperature within housing 12 or temperature within individual fuel cell cartridges 14 using temperature sensors (see, e.g., sensor 55 in FIG. 2). Other operational parameters may be monitored.

Memory 103 is configured to store executable code for use within controller 102. Controller 102 utilizes memory 103 to store a history of operations of fuel cell power system 10 or other desired data. For example, memory 103 comprises both read only memory (ROM) and random access memory (RAM) in the described embodiment.

Controller 102 is coupled to provide communications with control system 30 in the described embodiment. Alternatively, controller 102 is implemented within control system 30 and control system 30 is configured to control power conditioning operations in accordance with another embodiment. Other power conditioning control arrangements are provided in other embodiments.

Referring to FIG. 6, another configuration of the fuel cell power system is depicted as reference 10a. In the illustrated fuel cell power system 10a, fuel cell cartridges 14 are coupled in parallel with terminals 62, 63 using bus 60. Power conditioning circuitry 100 is intermediate bus 60 and terminals 62, 63 in the illustrated arrangement. The utilization of fuel cell power system 10 or 10a depends upon the particular application or use of the power system and the design choice of a user, designer, etc. Typically, fuel cell power system 10a of FIG. 6 is utilized for increased current applications while fuel cell power system 10 of FIG. 5 is utilized for increased voltage applications.

Referring to FIG. 7, a characteristic curve of an exemplary fuel cell power system is illustrated. The depicted graphical representation illustrates the voltage and current relationship of a fuel cell. This invention intends to optimize the operation of a fuel cell with respect to an I-V curve such as the one shown in FIG. 7. In particular, operation of the fuel cell can be limited to within a preferred range of this curve that provides for safe operation of the fuel cell, optimizes efficiency, or maximizes power output.

In numerous applications, it is desired to provide a substantially constant voltage potential at the output of individual fuel cell cartridges 14 and/or fuel cell power system 10 at terminals 62, 63. In accordance with certain aspects of the present invention, power conditioning circuitry 100 is configured to receive direct current electrical energy having a variable voltage potential (e.g., unconditioned from one or more fuel cell 90), and provide electrical energy having a substantially constant voltage potential. As described below, power conditioning circuitry 100 is configured for other operations according to other aspects of the present invention. For example, power conditioning circuitry 100 could be configured to provide inverter functionality alone or in addition to the direct current voltage conversion operations.

Referring to FIGS. 8–10, exemplary configurations of power conditioning circuitry 100 and control methodologies thereof are described. The depicted configurations of power conditioning circuitry 100 are exemplary and other arrangements are provided in other embodiments of the present invention.

The depicted DC—DC converter power conditioning circuitry 100 includes an input comprising input terminals 120, 122, converter circuitry 108 and output terminals 121, 123. Input terminals 120, 122 are configured to couple with fuel cell cartridges 14 using bus 60. Terminal 120 comprises a positive DC terminal and terminal 122 comprises a ground terminal.

Various exemplary configurations of power conditioning circuitry are respectively illustrated as references 100a–100c. The depicted configuration of power conditioning circuitry 100a comprises a buck or step-down DC—DC converter. The depicted configuration of power conditioning circuitry 100b comprises a boost or step-up DC—DC converter. The depicted configuration of power conditioning circuitry 100c comprises a current fed push-pull DC—DC converter. Power conditioning circuits 100a–100c individually include input terminals 120, 122 and output terminals 121, 123.

As previously described, power conditioning circuits 100a–100c are individually implemented in some configurations within fuel cell cartridges 14 to provide power conditioning on a modular (i.e., fuel cell cartridge 14) basis. In such configurations, input terminals 120, 122 are coupled with fuel cells 90 and output terminals 121, 123 are coupled with bus 60.

According to other aspects of the present invention, power conditioning circuits 100a–100c provide system power conditioning. In such arrangements, input terminals 120, 122 of power conditioning circuits 100a–100c are coupled with bus 60 and output terminals 121, 123 are coupled with or comprise terminals 62, 63 of fuel cell power system 10.

In some configurations, both DC—DC converter circuitry and inverter circuitry are utilized within a single power conditioning circuitry configuration. Accordingly, one or more of the depicted power conditioning circuits 100, 100a, 100b, 100c may be utilized in a given fuel cell cartridge 14 or fuel cell power system 10. For example, power conditioning circuitry 100, 100a, 100b, 100c comprising DC—DC converters may be initially utilized to convert a DC voltage potential from fuel cells 90 to another DC voltage potential. Thereafter, an inverter may be implemented or utilized to convert the DC converted electrical energy into alternating current electrical energy. Other arrangements are provided in other aspects of the invention.

Power conditioning circuits 100a–100c depicted in FIGS. 10–12 utilize switch mode power conditioning techniques. Switching devices are utilized to divert energy within the circuitry to at least one energy storage device (e.g., an inductor, transformer, capacitor). The switches typically comprise electronically controlled switches.

Controller 102 is configured to control the operation of switches 124 using gate control signals. As described further below, control over the illustrated power conditioning circuits 100a–100c is accomplished by pulse-width modulation (PWM) utilizing controller 102 in the described embodiment. The switching devices are switched on at a fixed interval or frequency while the time that the switch is left on varies (i.e., the duty cycle is varied). In the described configuration, controller 102 provides the pulse-width modulation switching control signals. As also detailed below, controller 102 monitors operational parameters of fuel cell power system 10, such as voltages, currents and temperatures to determine an appropriate pulse-width modulation duty cycle. Controller 102 is configured to vary the duty cycle of the control signals to provide a desired operation.

Power conditioning circuitry 100a includes switch 124 and an electrical energy storage device 128 comprising an inductor. Switch 124 is coupled with controller 102. Exemplary configurations of switch 124 include implementation as a MOSFET, insulated gate bipolar transistor (IGBT), bipolar junction transistor (BJT), thyristor, metal oxide semiconductor controlled thyristor (MCT), or gate-turn-off thyristor (GTO), for example.

In general, power conditioning circuitry 100a implemented as a step-down converter provides an output voltage at terminals 121, 123 which is less than an input voltage received via terminals 120, 122. Power conditioning circuitry 100a provides an output current which is greater than a received input current.

Power conditioning circuitry 100b includes switch 124 and an inductor as an energy storage device 128. Switch 124 is coupled with controller 102. In general, power conditioning circuitry 100b implemented as a step-up converter provides an output voltage at terminals 121, 123 which is greater than an input voltage received via terminals 120, 122. Power conditioning circuitry 100b provides an output current which is less than a received input current.

Power conditioning circuitry configured as a DC—DC converter is depicted as reference 100c. Depending on the turns ratio of transformer 130, this circuit can be a buck, boost, or both.

In other configurations, power conditioning circuitry 100 comprises non-isolated converter topologies for DC—DC conversion functions, such as buck-boost, Cuk and full-bridge, for example. A variety of isolated DC—DC converter schemes are also possible, such as fly-back, forward, push-pull, half and full-bridge.

Referring to FIG. 11, an exemplary methodology for determining appropriate duty cycles for pulse-width modulated control signals generated within controller 102 for control of power conditioning circuitry 100a–100c is described. Such methodology may be implemented within executable code stored within memory 103. Alternatively, such methodology may be implemented in hardware in another configuration. The depicted methodology is utilized for controlling the voltage of fuel cell power system 10 to a certain set point, such as an output voltage from fuel cell power system 10 of approximately 26 Volts. Other control methods are utilized in other embodiments.

Initially, a default duty cycle, such as 50%, is utilized upon start-up operations. Thereafter, the default duty cycle is varied in accordance with the below method.

At step S40, controller 102 receives data regarding operations of fuel cell power system 10. For example, controller 102 retrieves data regarding voltage potentials of individual fuel cell cartridges 14, voltage potential across terminals 62, 63 of fuel cell power system 10, output current supplied to a load coupled with fuel cell power system 10.

Thereafter, controller 102 proceeds to step S42 to determine whether fuel cell cartridge voltages are too low. A definition of too low is dependant upon the number of fuel cells 90 within a given fuel cell cartridge 14. In a described configuration, a voltage that is too low for a given fuel cell cartridge 14 is below approximately 0.6–0.65 Volts per fuel cell.

If the determined cartridge voltage of fuel cell cartridges 14 is unacceptable, controller 102 proceeds to step S44 to reduce a duty cycle. At step S44, controller 102 use an incremental step of approximately one percent to reduce the duty cycle being utilized. Thereafter, controller 102 returns to step S40.

Alternatively, if the condition at step S42 is acceptable, controller 102 proceeds to step S46 and determines whether the fuel cell power system voltage output is too high. For a 24 Volt battery bank, for example, a steady state voltage at or above about 30 Volts would be too high.

If the fuel cell power system output voltage is high, controller 102 proceeds to step S48 to again reduce the duty cycle. In one configuration, controller 102 is configured to reduce the duty cycle by an amount, such as by approximately one percent. Thereafter, controller 102 returns to step S40 to retrieve additional data.

Alternatively, if the condition is acceptable at step S46, controller 102 proceeds to step S50 to determine whether an output current of the fuel cell power system 10 is acceptable.

If the condition of step S50 is unacceptable, controller 102 proceeds to step S52 to reduce the duty cycle by a predetermined step, such as one percent, and thereafter returns to step S40.

If the condition at step S50 is acceptable, controller 102 proceeds to step S54 to compute the duty cycle based upon the output voltage of fuel cell power system cartridge voltages, and battery operating point. In the described embodiment, a proportional integral algorithm could be utilized to compute the duty cycle based upon the output voltage of fuel cell power system 10.

Referring to FIG. 12, exemplary circuitry to enable monitoring of current supplied from fuel cell power system 10 to an attached load 22 is illustrated. The depicted circuitry 140 comprises shunt circuitry 142 and an amplifier 144.

Shunt circuitry 142 is provided within an electrical connection coupled with ground terminal 63 of fuel cell power system 10. Shunt circuitry 142 comprises a 50 mV/400 Amp precision shunt in an exemplary configuration to provide a small voltage proportional to the current. Amplifier 144 is configured to measure the voltage potential across the shunt circuitry 142. Thereafter, amplifier 144 outputs an indication signal to controller 102. The signal outputted from amplifier 144 is provided to an analog-to-digital (A-D) converter. Controller 102 includes analog-to-digital converter circuitry in one configuration. Alternatively, analog-to-digital converter circuitry is implemented as separate circuitry from controller 102.

Referring to FIG. 13, exemplary circuitry 150 for monitoring the output voltage potential of fuel cell power system 10 is illustrated. The depicted circuitry 150 comprises a resistor divider network 153 coupled with output terminals 62, 63. Circuitry 150 additionally includes an amplifier 152 configured to output an indication signal to controller 102 corresponding to the output voltage potential. Exemplary load parameters are approximately 26 Volts and 200 Amps. Resistors of the amplifier configuration are preferably small low power precision resistors. The signal outputted from amplifier 152 is provided to an analog-to-digital converter. Controller 102 includes analog-to-digital converter circuitry in one configuration. Alternatively, analog-to-digital converter circuitry is implemented as separate circuitry from controller 102.

Referring to FIG. 14, exemplary circuitry 160 for monitoring the voltage of a fuel cell cartridge 14 is shown. Depicted circuitry 160 comprises a resistor divider network 163 coupled with fuel cell cartridge 14. The illustrated circuitry 160 additionally includes an amplifier 162 configured to output a signal to controller 102 corresponding to the voltage of fuel cell cartridge 14.

Multiplexers (not shown) may be utilized to provide coupling intermediate the individual circuitry 160 of fuel cell cartridges 14 and controller 102. The signal outputted from amplifier 162 is provided to an analog-to-digital converter. Controller 102 includes analog-to-digital converter circuitry in one configuration. Alternatively, analog-to-digital converter circuitry is implemented as separate circuitry from controller 102.

Referring to FIGS. 17–22, additional configurations and operations of a fuel cell power system are illustrated. The depicted fuel cell power system configurations are exemplary to depict alternative and/or additional aspects of the present invention. Other fuel cell power system embodiments or arrangements are possible in addition to those depicted and described herein.

Where appropriate, components of the illustrated fuel cell power systems of FIGS. 17–22 may be implemented using components described above with reference to FIGS. 1–16. For example, and according to one aspect of the invention, the fuel cell power system embodiments described with reference to FIGS. 15–20 illustrate components which may be integrated with appropriate components of the configuration described above with reference to FIG. 2. More specifically, the fuel cell power system components of FIGS. 15 and 17 may be implemented within housing 12 and fuel cells 202 are provided in communication with an appropriate fuel supply and plenum, such as respective references 23, 51 of FIG. 2, for example, or other components to provide a functional system. In sum, other appropriate components may be utilized to provide functional fuel cell power systems in conjunction with the components depicted in the configurations of FIGS. 15 and 17.

According to other aspects, appropriate modifications of the fuel cell power system depicted in FIG. 2 may be made to implement some of the alternative or additional aspects described hereafter. For example, the battery stage described below may be coupled with the output terminals 62, 63 illustrated in FIG. 2. In addition, the power conditioning control operations described below may be implemented within control system 30 or in a separate appropriate controller.

Referring initially to FIG. 15, components of an exemplary fuel cell power system 200 are depicted. In general, fuel cell power system 200 includes a plurality of fuel cells 202 (arranged in cartridges 214), power conditioning circuitry 204, a controller 206, a battery stage 208 and output terminals 210 adapted to couple with a load 212 arranged to receive appropriate electrical energy from fuel cell power system 200.

Exemplary fuel cells 202 comprise polymer electrolyte membrane (PEM) structures embodied as membrane electrode assembly (MEA) fuel cells or membrane electrode diffusion assembly (MEDA) fuel cells. Other fuel cell configurations are possible for generating electrical energy.

In the described exemplary arrangement, fuel cells 202 are arranged in a plurality of fuel cell housings. Exemplary housings include cartridges 214 which may be configured to be conveniently removable from the system 200 in case of failure or for other reasons. Although not shown in FIG. 15, cartridges 214 are coupled with an appropriate supply of fuel (e.g., hydrogen) and oxygen to enable the generation of electrical energy. In one configuration, cartridges 214 are coupled with a plenum, such as plenum 51 depicted in FIG. 2, for supplying oxygen and an appropriate fuel supply.

In one possible embodiment, ten fuel cells are provided coupled in series within an individual cartridge 214. Individual fuel cells typically generate electrical energy at a voltage of approximately 0.6–0.7 Volts. Thus, a single cartridge 214 provides a voltage of approximately 6–7 Volts in the described exemplary configuration. Other arrangements of fuel cells within a cartridge 214 are possible including more or less fuel cells and/or arranged in parallel.

Power conditioning circuitry 204 is configured to electrically condition electrical energy generated by the fuel cells. In the depicted arrangement, power conditioning circuitry 204 comprises a plurality of power conditioning circuits 216. Power conditioning circuits 216 electrically condition electrical energy of respective fuel cell cartridges 214 in the described exemplary embodiment. As shown, power conditioning circuits 216 are arranged in parallel with a bus 207 in one possible configuration.

As shown, a plurality of fuel cell cartridges 214 and respective power conditioning circuits 216 are implemented within fuel cell power system 200. The number of cartridges 214 and circuits 216 may be varied corresponding to a desired application (and load requirements) and include more or less cartridges 214 and more or less circuits 216 in such other implementations.

Power conditioning circuits 216 are implemented as switch mode power conditioning circuits in the described embodiment. Exemplary configurations of power conditioning circuits 216 embodied as switch mode power conditioning circuits are shown and described above with respect to FIGS. 10–12.

In a first exemplary arrangement, power conditioning circuits 216 are implemented as DC—DC converters configured to convert electrical energy from fuel cell cartridges 214 received at a first voltage to a second different voltage. In one exemplary embodiment, power conditioning circuits 216 are implemented utilizing the boost circuitry depicted above in reference to FIG. 9 in applications wherein it is desired for power conditioning circuitry 204 to boost received DC voltages to higher potentials. For example, electrical energy is received at a potential of 6–7 Volts from fuel cell cartridges 214 in accordance with one exemplary arrangement. Individual power conditioning circuits 216 are configured to boost the direct current voltage to approximately 24 or 48 Volts depending upon a given application. Other voltages may be desired. Bus 207 is configured to supply the electrical energy having the increased voltage to battery stage 208 and output terminals 210.

Power conditioning circuits 216 may be arranged to implement alternate operations or operations in addition to the DC—DC conversion operations. For example, power conditioning circuits 216 may be implemented to provide multiple output functionality.

Conditioning circuits 216 may be configured as one of many converter topologies known in the art.

Battery stage 208 comprises one or more batteries coupled with bus 207 and another voltage reference, such as ground. Electrical energy from fuel cells 202 may be applied directly to load 212 if necessary. The batteries of battery stage 208 are charged using electrical energy generated within the fuel cells 202 when excess electrical energy is available upon bus 207 (i.e., if not all of the electrical energy is directed to load 212). In addition, batteries of battery stage 208 selectively supply electrical energy to load 212 depending upon the load demands thereof.

Depending upon a given configuration, battery stage 208 comprises one or more battery configured to provide a desired output voltage, such as 24 Volts, 48 Volts or electrical energy at another voltage. In one configuration, battery stage 208 comprises twelve 2 Volts cells arranged in series to provide an output voltage of 24 Volts. Exemplary cells utilized within battery stage 208 are available from battery suppliers. Other arrangements are possible.

Controller 206 is configured to monitor and control operations within fuel cell power system 200. An exemplary embodiment of controller 206 is illustrated in FIG. 16 comprising processing circuitry 220 coupled with sequencing circuitry 222. In one exemplary embodiment, processing circuitry 220 is implemented as a microprocessor. Control and monitoring functionality described with reference to processing circuitry 220 of controller 206 may be implemented using controller 102 (FIG. 5) in one example. Processing circuitry 220 of controller 206 is configured to execute executable code (provided within appropriate memory, not shown) to monitor and control operations of fuel cell power system 200 in such an arrangement. Other configurations of processing circuitry 220 are possible.

Sequencing circuitry 222 is configured to receive control signals from processing circuitry 220 and to apply received control signals to respective power conditioning circuits 216 at different moments in time as described in more detail below. Such minimizes the presence of disturbances, such as ripple currents, upon the output terminals 210 as described below. Exemplary delay circuitry 222 is configured as a plurality of daisy-chained flip flops configured to provide appropriate sequence within the control signals comprising pulse width modulated signals in the described exemplary configuration.

Controller 206 is configured to implement battery maintenance operations of battery stage 208. Battery maintenance operations include charging of batteries within battery stage 206 to maintain voltages of the batteries within a predetermined voltage range as well as maintaining operation of the fuel cells of cartridges 214 within a desired predefined voltage range (e.g., 0.6–0.7 Volts per fuel cell) to avoid damaging such fuel cells.

In the exemplary embodiments depicted in FIGS. 15 and 17, controller 206 monitors electrical status (e.g., voltage and\or current) of fuel cells within respective fuel cell cartridges 214 and batteries within battery stage 208 via signals communicated using line 217. Responsive to the monitoring of electrical status of fuel cells 202 and battery stage 208, controller 206 outputs one or more control signal via a control line 218 to control respective power conditioning circuits 216. As described further below, the control signals are pulse width modulated control signals which control switches of power conditioning circuits 216 to maintain the operation of the fuel cells 202 within a desired range.

Various control methodologies are contemplated, and details of some of the control methodologies implemented by controller 206 are described herein. In a first control implementation, controller 206 averages an electrical status of respective fuel cell cartridges 214 and provides a common control signal via line 218 to control a plurality of power conditioning circuits 216 coupled therewith. In such an embodiment, the control signal controls all of the power conditioning circuits 216. The electrical status from cartridges 214 is averaged to generate the control signal for controlling operation of power conditioning circuits 216 in such an embodiment.

Alternatively, controller 206 receives individual electrical status from respective fuel cell cartridges 214. Controller 206 is configured to process such received electrical status and to generate a plurality of respective control signals to control respective power conditioning circuits 216 corresponding to the respective electrical status of the respective fuel cell cartridges 214. The generation of a plurality of control signals permits one power conditioning circuit 216 to be controlled based upon the electrical status of the respective fuel cell cartridge 214 and independent of the statuses of other cartridges 214. Such increases the complexity of controller 206 but enables control of the individual power conditioning circuits 216 responsive to the statuses of the respective cartridges 214.

For example, a first fuel cell cartridge 214 may be operating within a desired voltage range while another fuel cell cartridge 214 may be outside the desired voltage range. The electrical statuses of both fuel cell cartridges 214 are applied to controller 206 via line 217. Controller 206 generates and outputs a control signal to the power conditioning circuit 216 of the first fuel cell cartridge to maintain the operation of the first fuel cell cartridge within its operating range. However, for the out of range fuel cell cartridge 214, controller 206 applies a different or modified control signal in an attempt to bring the respective fuel cell cartridge 214 into the desired range. According to aspects of the invention described herein, controller 206 varies a duty cycle of a pulse width modulated control signal to maintain or bring a respective cartridge 214 within a desired electrical status range comprising, for example a desired voltage range of operation for the fuel cells thereof.

In additional aspects of the invention, controller 206 monitors one or more electrical status of the batteries within battery stage 208. Responsive to such monitoring, controller 206 controls respective power conditioning circuits 216 as described in further detail below by varying the duty cycle (s) of the pulse width modulated control signal(s). Such control implements charging operations, if appropriate, corresponding to the electrical status of batteries within battery stage 208. Possible charging modes include bulk, trickle and float charging in one exemplary embodiment. Other battery charging operations may be implemented corresponding to the sophistication of battery stage 208 and the design of particular batteries used within battery stage 208.

Regardless of whether controller 206 outputs a common control signal to control power conditioning circuits 216, or whether controller outputs a plurality of respective control signals corresponding to individual circuits 216 as described previously, the duty cycle(s) of the pulse width modulated control signal(s) are varied responsive to monitoring of electrical status of batteries within battery stage 208 and/or electrical status of the fuel cells according to additional aspects of the invention.

Accordingly, controller 206 is configured to adjust power conditioning circuits 216 responsive to the monitoring the electrical status of the fuel cells and/or the batteries. Such monitoring and control of power conditioning circuits 216 implements maintenance of operation of the fuel cells and fuel cell cartridges 214 within a proper range and simultaneously implements battery maintenance operations. For example, charging of the batteries of battery stage 208 occurs if the operation of the fuel cells is proper (i.e., electrical status, such as voltage, is within a desired range).

As described further below, controller 206 initially provides control signals according to the electrical status of one or more cartridge 214 (or individual fuel cells if cartridges are not utilized) to maintain the cartridges 214 within a desirable electrical status range. According to aspects of the invention, the electrical status of the fuel cells is monitored to insure that the voltages thereof do not drop below a desired threshold, such as 0.6 Volts per cell. If the electrical status of the fuel cells is proper, then controller 206 adjusts the control signals if necessary responsive to monitoring of batteries of battery stage 208 to maintain the electrical status of the batteries within a desired range. Further details of monitoring and controlling power conditioning circuits 216 are described below.

Referring to FIG. 17, another embodiment of a fuel cell power system is depicted corresponding to reference 200a. Fuel cell power system 200a includes fuel cells 202, power conditioning circuitry 204, controller 206, battery stage 208 and plural terminals 210 adapted to couple with a load 212. Fuel cell cartridges 214 are depicted coupled with a ground reference voltage in the depicted arrangement.

Fuel cell power system 200a additionally includes a first (also referred to as an intermediate) bus 230 and a second (also referred to as an output) bus 232. Electrical energy generated within fuel cells of cartridges 214 is received within first bus 230 at an intermediate voltage such as 6–7 Volts (corresponding to the exemplary cartridge 214 embodiment wherein ten fuel cells are arranged in series) or other potential. Following conditioning within power conditioning circuitry 204 comprising DC\DC voltage conversion circuitry in one exemplary embodiment, electrical energy is provided to second bus 232 at an increased voltage, such as 24 Volts, 48 Volts or other desired potential. In the described embodiment, individual power conditioning circuits 216 are configured to electrically condition electrical energy received from first bus 217 as shown. Power conditioning circuits 216 are implemented within boost configurations (for example, shown in FIG. 9) in the presently described embodiment to increase the voltage of the electrical energy received within first bus 230 and before application to second bus 232.

Fuel cell power systems 200a of the present invention include one or more fuel cell cartridge 214 and one or more power conditioning circuit 216 (the number of cartridges 214 and circuits 216 of FIG. 17 is exemplary and more or less cartridges and circuits are provided according to other embodiments). In the embodiments described herein, the number of power conditioning circuits 216 and cartridges 214 may be varied depending upon the application of the fuel cell power system 200, 200a. Typically, the number of power conditioning circuits 216 may be varied according to the number of fuel cell cartridges 214 utilized and the wattage of fuel cell power system 200a. Referring to the configuration of FIG. 17, the number of power conditioning circuits 216 utilized depends upon the power output of the fuel cell power system 200a and is not directly related to the number of fuel cell cartridges 214 in at least one embodiment.

For the embodiment illustrated in FIG. 17, a plurality of legs 228 are depicted coupled in parallel with first bus 230. Individual legs 228 include a fuel cell cartridge 214 coupled with an associated shunt device 234, a blocking device 236 and a fuse 238 in the illustrated exemplary embodiment.

Shunt device 234 and blocking device 236 are arranged to implement shunting operations as described in U.S. Pat. No. 6,096,449, and incorporated herein by reference. Shunting of fuel cells is utilized to enhance the performance of the fuel cells. To implement shunting of fuel cells of cartridge 214 within a desired leg 228, controller 206 controls blocking device 236 and shunt device 234 of the respective leg 228. In particular, controller 206 opens blocking device 236, comprising a field effect transistor in one exemplary embodiment, sized and configured to accommodate electrical energy from the respective cartridge 214. Opening the appropriate blocking device 236 isolates the respective fuel cell cartridge 214 and shunt device 234 from bus 230. Following opening of blocking device 236, controller 206 closes shunt device 234 to shunt the output of fuel cell cartridge 214 to a ground reference. After a predetermined amount of time, controller 206 opens the shunt device 234 to isolate the respective fuel cell cartridge 214 from ground, and closes the blocking device 236 providing fuel cell cartridge 214 once again online with first bus 217. Fuses 238 protect electrical components within respective legs 228 from the presence of overage conditions upon bus 230.

As mentioned above, controller 206 is configured to monitor electrical status of fuel cells within fuel cell cartridges 214 and batteries within battery stage 208 and to control power conditioning circuitry 204 responsive to such monitoring. According to aspects of the invention, controller 206 controls power conditioning circuits 216 to maintain an electrical status, such as voltage, of fuel cells of cartridges 214 and batteries of battery stage 208 within desired respective ranges.

In the exemplary configuration of fuel cell power system 200a, controller 206 monitors average voltages of the fuel cell cartridges 214 upon first bus 230. In addition, controller 206 monitors electrical status of batteries within battery stage 208. Controller 206 is configured to apply a common control signal to individual power conditioning circuits 216 to maintain operation of fuel cells and/or batteries within respective desired electrical status ranges.

Alternatively, controller 206 monitors respective ones of fuel cell cartridges 214 and provides a plurality of different control signals to control operations of respective power conditioning circuits 216 responsive to the monitoring. Such plurality of control signals may also be modified responsive to monitoring of the batteries of battery stage 208. For example, if the electrical status of one of the cartridges 214 is within an acceptable range, the control signal to the cartridge 214 may be modified if necessary to maintain electrical status of the batteries of battery stage 208 within a proper range.

As mentioned above, and according to one aspect of the present invention, controller 206 provides pulse width modulated control signal(s) to control power conditioning circuits 216 of the configurations of FIG. 15 and FIG. 17. Controller 206 is configured to vary the duty cycle(s) of the pulse modulated signal(s) to control the operations of the switching devices of the power conditioning circuits 216.

To provide optimal operation of fuel cells within respective cartridges 214, it is desired to maintain an electrical status of such fuel cells or cartridges 214 within a desired range. As mentioned above, individual fuel cells within cartridges 214 preferably operate within a desired predefined range of 0.6–0.7 Volts for the types of exemplary fuel cells described herein. It is desired to maintain the fuel cells of cartridges 214 within the desired range during operations of the fuel cell power systems 200, 200a. In addition, controller 206 monitors the electrical status of batteries within battery stage 208 and controls operations of power conditioning circuits 216 responsive to electrical status of the batteries.

In one arrangement of the invention, the condition of fuel cells within cartridges 214 is given a higher degree of importance compared with battery maintenance during control operations to maintain operation of fuel cells 202 within an appropriate range. Thereafter, battery maintenance operations are implemented if the fuel cells within cartridges 214 are within the proper, predefined range.

For example, controller 206 monitors electrical status comprising voltages of respective cartridges 214 or an average voltage of all cartridges 214. If the monitored voltage or other electrical status is below a desired predefined range (e.g., <0.6 Volts for an individual fuel cell or <6 Volts for ten fuel cells in series), controller 206 decreases the duty cycle of the appropriate pulse width modulated control signal in an attempt to increase the voltage of the fuel cell or fuel cell cartridge. If the monitored electrical status exceeds a desired range (e.g., >0.70 Volts per fuel cell or >7 Volts for ten fuel cells in series) controller 206 increases the pulse width modulated control signal in an attempt to return the fuel cell(s) or cartridge to the desired range.

In one exemplary arrangement, control of switching devices of power conditioning circuits 216 is described to maintain operation of fuel cells or fuel cell cartridges within a desired predefined range. Fuel cells within cartridges 214 begin to generate electrical energy and a voltage is present at the output of the cartridges 214 following the introduction of appropriate fuel and oxygen to cartridges 214. Voltages of the fuel cells increase as the fuel is consumed and electrical energy is produced. Controller 206 continues to monitor the electrical status of the fuel cells.

Once the monitored voltage (either on an individual fuel cell\cartridge basis or average of all fuel cells\cartridges) reaches a threshold of a desired range after startup, controller 206 begins to apply a pulse width modulated control signal to the switching devices of the power conditioning circuits 216. One pulse width modulated control signal is applied to all cartridges 214 in one arrangement (e.g., if the voltages are averaged) or a plurality of pulse width modulated control signals are applied to respective individual fuel cells or cartridges 214 in other arrangements (e.g., if respective individual voltages are being monitored).

Controller 206 adjusts and applies the control signal(s) to implement desired power conditioning operations, to provide operations of the fuel cells within a desired range, and to implement battery maintenance operations. The chosen duty cycle of the control signal may be selected from 0 to 100%. The appropriate duty cycle is selected to maintain operations of the fuel cells within the desired range (e.g., 0.6 Volts–0.7 Volts per cell). During operations of systems 200, 200*a*, the duty cycle is varied to maintain the fuel cells within the desired range.

Controller 206 is configured to increment or decrement the duty cycle in defined steps in one exemplary embodiment to maintain the fuel cells within the desired range. The minimum duty cycle is 0% and the maximum duty cycle is approximately 80% in one exemplary embodiment. Any increase in duty cycle from zero jumps to 20% duty cycle in the described exemplary embodiment. In addition, there are forty different evenly spaced duty cycle set points between 20% and 80% in the described exemplary embodiment for adjustment to provide operation of the fuel cells within the desired range.

In general, the duty cycle may be increased in an attempt to obtain more electrical energy from the fuel cells. In the described arrangement, after the duty cycle is increased from 0 to 20% in one step, further increases to the duty cycle of the control signal are implemented in approximately 1% steps unless the maximum duty cycle of 80% is encountered.

Conversely, the duty cycle may be reduced if it is desired to increase the voltage of the fuel cells. The duty cycle is decremented in steps of 1% unless the duty cycle is present at 20% wherein it is decremented to 0% in one step. Other duty cycle incremental and decremental schemes are possible in accordance with other aspects of the present invention.

Referring to FIGS. 18A–18B, exemplary methodologies performed by an appropriate controller (e.g., controller 206) of a fuel cell power system are illustrated. In particular, executable code is provided within appropriate storage devices (e.g., memory) of the power systems to cause the controller to execute the depicted methodologies. The illustrated methodologies depict exemplary fuel cell and battery maintenance operations to maintain operation of the fuel cells within a desired predefined range (e.g., approximately 0.6–0.7 Volts per cell).

The depicted methodologies are executed after startup conditions wherein voltages of the fuel cells are within a desired range. For example, the methodologies of FIGS. 18A–18B are implemented once cartridges 214 are indicated to be present, on-line and generating a minimum voltage, such as 6.0 Volts for arrangements wherein cartridges 214 have ten series arranged fuel cells. Other methodologies may be utilized to maintain fuel cells within cartridges 214 within a desired range.

Initially, at a step S100, the controller obtains fuel cell electrical status from the respective fuel cell cartridges 214. In the depicted embodiment, the obtained fuel cell electrical status comprises fuel cell cartridge voltage. Other electrical status may be monitored and utilized.

Depending upon the implementation of the fuel cell power system, the controller monitors an average electrical status of all fuel cell cartridges if a common control signal is utilized, or alternatively, individual respective electrical statuses of the respective fuel cell cartridges 214 are monitored if power conditioning circuits 216 are individually controlled using plural, discrete control signals.

At a step S102, controller 206 determines whether the fuel cell electrical status is proper. In the described exemplary embodiment, the controller determines whether the electrical status comprising voltage of the fuel cell cartridges is above 6 Volts. This is accomplished on an individual cartridge basis or an average of all cartridges in exemplary embodiments.

If the condition of step S102 is negative, the controller proceeds to step S104 to decrement the duty cycle of one or more control signal. As described previously, the controller decrements the duty cycle by 1% as long as the duty cycle is above 20% in the described exemplary implementation. If the duty cycle is at 20%, the controller decrements the duty cycle to 0. Typically, increases to the duty cycle are implemented during battery maintenance operations. However, if necessary, the controller can increment the duty cycle at step S104 if the voltage of the fuel cell cartridge(s) 214 is above a desired voltage (e.g., 7 Volts).

The controller proceeds to a step S106 if the condition of step S102 is affirmative. At step S106, controller 206 proceeds to execute a battery maintenance methodology. One example of battery maintenance operations is depicted in FIG. 18B.

Referring to FIG. 18B, and at steps S110 and S112, the controller obtains electrical status information from the batteries within battery stage 208. In particular, at step S110, the controller measures the voltage of the batteries within stage 208 and at step 112 the controller measures the current of the batteries within stage 208.

At a step S114, controller 206 determines whether the battery voltage is above a bulk charging threshold. An exemplary bulk charging threshold voltage is approximately 29.4 Volts for a 24 Volt application of the fuel cell power system.

If the condition of step S114 is affirmative, controller 206 proceeds to a step S116 to reduce the duty cycle of the control signal(s) and thereafter returns to step S100 in FIG. 20*a*. At step S116, the duty cycle of the common control signal is decremented or the duty cycles of the individual, respective control signals are decremented.

The controller executes a step S118 if the condition of step S114 is negative. At step S118, the controller determines whether the battery voltage is above a float charging threshold and the battery current (charging) is above a bulk charging threshold. In the described exemplary 24 Volt configuration of fuel cell power systems 200, 200*a*, the battery voltage float charging threshold is approximately 28.3 Volts and the battery current bulk charging threshold is approximately 2% of a lead-acid battery 20 hour capacity rating (e.g., 8A for 400 AmpHour batteries).

If the condition of step S118 is affirmative, the controller proceeds to step S116 to reduce the duty cycle of the control signal(s).

Alternatively, the controller proceeds to a step S120 if the condition of step S118 is negative. At step S120, the controller determines whether the battery voltage is below a bulk charging threshold and the battery current (charging) is above a bulk charging threshold. If the condition of step S120 is negative, the controller returns to step S100 of FIG. 18A.

If the condition of step S120 is affirmative, the controller proceeds to a step S122 to increment the duty cycle of the control signal and returns to step S100 of FIG. 18A. In one exemplary embodiment, the controller performs the depicted methodologies of FIGS. 18A and 18B every 20 milliseconds.

Figure 19:
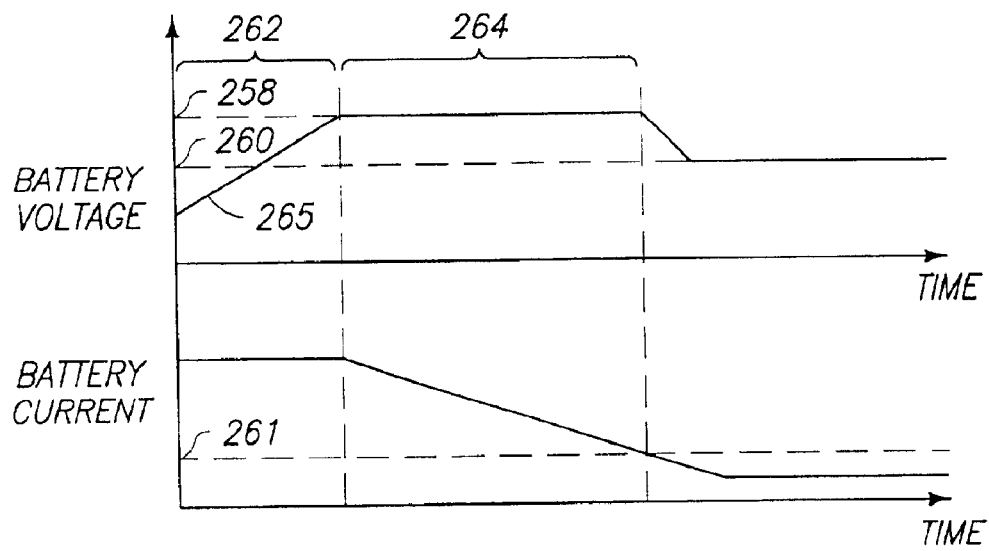
FIG. 19 is a graphical representation of electrical status of batteries of a fuel cell power system during different modes of charge.

Referring to FIG. 19, battery maintenance operations are further described with reference to battery voltage and battery current. Battery cells typically have a bulk charging threshold voltage and a float charging threshold voltage depicted as 258, 260, respectively in FIG. 19.

For the cells utilized within battery stage 208 of the exemplary embodiment, the bulk charging threshold voltage is approximately 2.45 Volts\battery cell or approximately 29.4 Volts for twelve series arranged cells of battery stage 208 while the float charging threshold voltage is approximately 2.36 Volts\battery cell providing a float charging threshold of approximately 28.3 Volts. It is desired to maintain the voltage of the batteries of battery stage 208 within a range of 28.3 Volts and 29.4 Volts. The operations of power conditioning circuits 216 are adjusted if the electrical status of the batteries falls out of this range and the fuel cells are operating within their desired individual range of 0.6 Volts–0.7 Volts. The current into and out of battery stage 208 depends on the load 212.

One period of time 262 illustrates a condition wherein the fuel cells are generating more current than is utilized by load 212 and the battery voltage is less than the bulk charging threshold voltage. During period in time 262, the fuel cells are providing the maximum current output without the fuel cells going below the desired voltages for the fuel cells. Inasmuch as the current from the fuel cells is not entirely utilized by the load 212, a portion of the current is utilized to charge the batteries within battery stage 208 resulting in an increase in battery voltage as indicated by line 265.

Once the upper threshold or the bulk charging threshold voltage of 29.4 Volts is reached, controller 206 decrements the duty cycle according to the methodology depicted in FIGS. 18A–18B during a second moment of time 264. The current is decreased during moment of time 264 as the batteries of battery stage 208 continue to charge. Once the bulk charging threshold current 261 is reached, the batteries within the battery stage 208 are fully charged. Thereafter, controller 206 maintains the battery voltage at the float charging threshold until the load increases. Thereafter, controller 206 can increment or otherwise appropriately adjust the duty cycle of the control signals applied to the power conditioning circuits 216 to accommodate increases in load demands and to maintain the electrical status of batteries of battery stage 208 within a desired range.

According to additional aspects of the present invention, the timing of the switching of an individual power conditioning circuit 216 may be controlled to be out of phase with switching of other power conditioning circuits 216 to further minimize disturbances and minimize ripple currents in the fuel cell power systems. 360° may be divided by the number of power conditioning circuits 216 being utilized to calculate the appropriate spacing between rising edges of control signals used to control the power conditioning circuits 216 such that output pulses from individual power conditioning circuits 216 tend to cancel one another instead of adding together magnifying the disturbances. Such operates to minimize the ripple current upon bus 207 of FIG. 15 or bus 232 of FIG. 17, to minimize the amount of capacitance needed to smooth the output electrical energy, as well as to lower the radio frequency interference noise generated by the systems 200, 200a.

Figure 20:
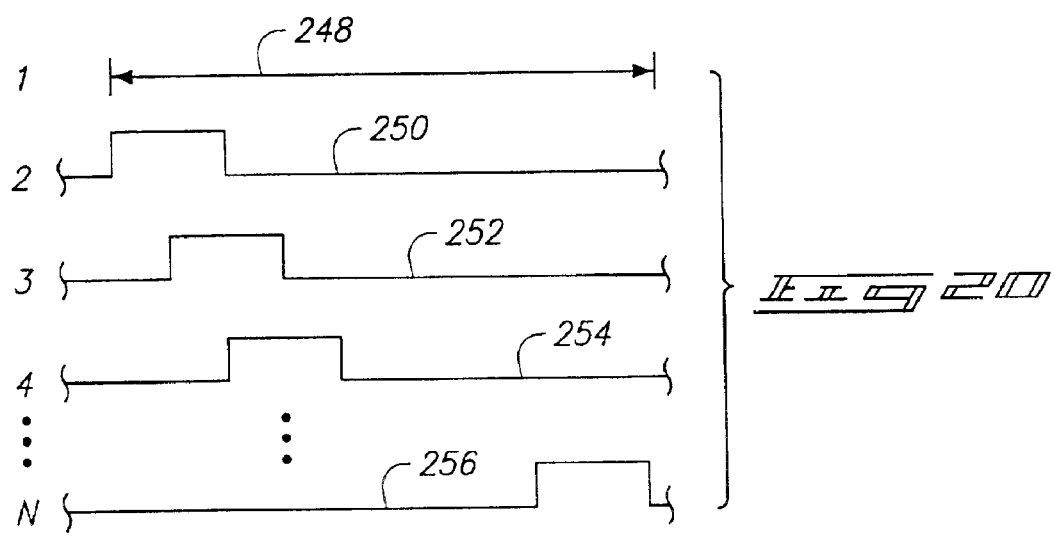
FIG. 20 is an illustrative representation of exemplary control signals configured to control power conditioning circuits of a fuel cell power system.

Referring to FIG. 20, exemplary control signals are depicted for controlling respective power conditioning circuits 216 within systems 200, 200a. The control signals have a desired frequency tailored to the configuration of the power conditioning circuit 216 being utilized. For example, if circuits 216 are implemented using the switch mode power conditioning boost configuration of FIG. 9, the control signals to control switching of the respective circuits 216 have an exemplary switching frequency (e.g., 20 kHz) resulting in a switching period 248. The control signal opens and closes the appropriate switch (e.g., switch 124 of FIG. 9) according to switching period 248 during power conditioning operations. For a switching frequency of 20 kHz, the switching period 248 is approximately 0.05 ms.

If a common control signal is utilized to control all power conditioning circuits 216, such control signal may be applied to a series of daisy-chained D type flip flops comprising delay circuitry 222 of FIG. 16. The number of flip flops used intermediate control signals of adjacent power conditioning circuits 216 and the control frequency of the flip flops may be tailored to spread the switching of respective power conditioning circuits 216 over a switching period 248 as illustrated in FIG. 20. FIG. 20 depicts a power system wherein N power conditioning circuits 216 are controlled using a plurality of respective control signals 248, 250, 252, 254, 256 offset in time as shown to minimize switching disturbances.

According to one exemplary embodiment, sequencing circuitry 222 of FIG. 16 is configured to provide control signals 248, 250, 252, 254, 256 which are evenly spread across switching period 248. The sequencing circuitry 222 may be implemented using a programmable logic device having the daisy chained flip flops arranged in series. Other configurations of sequencing circuitry 222 are possible.

The generation of control signals 248, 250, 252, 254, 256 may be derived from a single control signal for common control configurations wherein sequencing circuitry 222 applies the control signals 248, 250, 252, 254, 256 to the respective power conditioning circuits 216 at different moments in time during switching period 248 as illustrated in FIG. 20. In such an embodiment, control signals 248, 250, 252, 254, 256 are identical signals which are offset in time by 360 degrees divided by the number of circuits 216 being controlled as implemented using sequencing circuitry 222 in the exemplary embodiment.

The depicted sequencing of control signals may also be utilized in applications where controller 206 generates a plurality of different control signals applied to individual respective power conditioning circuits 216 responsive to monitoring of the respective fuel cell cartridges 214. In one possible exemplary implementation, sequencing circuitry 222 includes a plurality of control lines or paths configured to output the respective control signals to the respective power conditioning circuits 216 using lines 218. One control line or path includes no sequencing while an adjacent line may implement delay to the respective control signal by a desired amount of time to minimize the ripple disturbances. In one embodiment, the individual control lines or paths of sequencing circuitry 222 include different numbers of D type flip flops to implement the desired different sequence for the respective different control signals over the switching period 248.

In some configurations, even spacing of the application of the control signals across the switching period is not possible. The control signals may still be provided in an offset uneven relationship to minimize disturbances if desired or necessary.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fuel cell power system comprising:
    a plurality of fuel cells configured to generate electrical energy;
    a plurality of switch mode power conditioning circuits configured to electrically condition the electrical energy generated by the fuel cells, and wherein the plurality of switch mode power conditioning circuits are associated with the individual fuel cells; and
    a controller which generates a control signal, and which monitors an electrical status of the respective fuel cells, and further which adjusts the conditioning of the electrical energy generated by the respective fuel cell using the individual switch mode power conditioning circuits responsive to such monitoring, and wherein the controller includes sequencing circuits which applies the control signal from the controller to the respective switch mode power conditioning circuits at different moments in time.

2. A fuel cell power system comprising:
    a plurality of fuel cells configured to generate electrical energy:
    a plurality of switch mode power conditioning circuits each comprising a switch, and an electrical energy storage device and which are configured to electrically condition the electrical energy generated by the respective fuel cells, and wherein the plurality of switch mode power conditioning circuits are associated with the respective fuel cells;
    a battery having a voltage and which is electrically coupled with each of the switch mode power conditioning circuits, and which further stores the electrical energy generated by the respective fuel cells; and
    a controller which monitors the voltage of the battery, and which further provides a pulse width modulated control signal having a duty cycle and which controls the switching of the respective switch mode power conditioning circuits, and wherein the controller varies the duty cycle of the pulse width modulated control signal to adjust the conditioning of the electrical energy generated by the respective fuel cells using the respective switch mode power conditioning circuits in response to the monitoring to substantially maintain the voltage of the battery within a defined range; and
    sequencing circuitry which applies the pulse width modulated control signal to the respective switch mode power conditioning circuits at different moments in time.

3. A fuel cell power system comprising:
    a plurality of fuel cells;
    a plurality of switch mode power conditioning circuits which each include an energy storage device and a switch, and wherein each of the switch mode power conditioning circuits are configured to electrically condition electrical energy which is generated by the respective fuel cells; and
    a controller which provides a plurality of pulse width modulated control signals having a duty cycle to the respective switch mode power conditioning circuits to control the respective switches; monitors an electrical status of the respective fuel cells; and which varies the duty cycles of the pulse width modulated control signals, and wherein the controller adjusts the conditioning of the electrical energy generated by the respective fuel cells by utilizing the respective switch mode power conditioning circuits in response to the monitoring, and wherein the controller further includes a sequencing circuit electrically coupled with the respective switch mode power conditioning circuits and which receives at least one of the pulse width modulated control signals, and which applies a first of the pulse width modulated control signals to a first of the switch mode power conditioning circuits at a first moment in time, and applies a second of the pulse width modulated control signals to a second one of the switch mode power conditioning circuits at a second moment in time, which is after the first moment in time.

4. A fuel cell power system comprising:
    a plurality of fuel cells;
    a plurality of switch mode power conditioning circuits each including an energy storage device, and a switch, and wherein the respective switch mode power conditioning circuits electrically condition electrical energy which is generated by the respective fuel cells; and
    a controller which provides a plurality of pulse width modulated control signals which have a duty cycle to the respective switch mode power conditioning circuits to control the respective switches, and wherein the controller further monitors an electrical status of the respective fuel cells, and varies the duty cycle of the pulse width modulated control signals to adjust the conditioning of the electrical energy in response to the monitoring, and wherein the controller applies the pulse width modulated control signals to the respective switch mode power conditioning circuits at different moments in time during a switching period.

5. A method of operating a fuel cell power system comprising:
    generating electrical energy using a plurality of fuel cells;
    conditioning the electrical energy using a plurality of switch mode power conditioning circuits individually associated with respective ones of the fuel cells, and wherein the switch mode power conditioning circuits each comprise a switch, and an electrical energy storace device;
    providing a pulse width modulated control signal to control the respective switches;
    monitoring an electrical status of the respective fuel cells; and
    adjusting the condition of the electrical energy generated by the respective fuel cells in response to the monitoring, and wherein the adjusting comprises varying a duty cycle of the pulse width modulated control signal, and applying the pulse width modulated control signal to the respective switch mode power conditioning circuits at different moments in time.

6. A method of operating a fuel cell power system comprising:

generating electrical energy using a plurality of fuel cells;

conditioning the electrical energy by using a switch mode power conditioning circuitry comprising a plurality of switch mode power conditioning circuits associated with the respective fuel cells, and wherein each of the switch mode power conditioning circuits comprises a switch and an electrical energy storage device configured to electrically condition the generated electrical energy;

controlling the respective switches by using a pulse width modulated control signal;

storing the electrical energy generated within a battery;

monitoring a voltage of the battery;

adjusting the conditioning of the electrical energy by using the plurality of switch mode power conditioning circuits in response to the monitoring of the voltage of the battery, and wherein the adjusting further comprises increasing a duty cycle of the pulse width modulated control signal in response to the voltage of the battery being below a first threshold, and decreasing the duty cycle of the pulse width modulated control signal in response to the voltage of the battery being above a second threshold;

providing electrical energy from the respective switch mode power conditioning circuits to a load; and applying the pulse width modulated control signal to the switch mode power conditioning circuits at different moments in time to control the respective switches of each of the switch mode power conditioning circuits.

7. A method of operating a fuel cell power system comprising:

generating electrical energy using a plurality of fuel cells;

conditioning the electrical energy of the fuel cells using a plurality of switch mode power conditioning circuits individually including an electrical energy storage device and a switch; and providing a plurality of control signals to the switch mode power conditioning circuits during a switching period to control the respective switches, wherein the providing the control signals comprises applying the control signals to the switch mode power conditioning circuits at different moments in time during the switching period.

8. The method of claim 7 wherein the providing comprises providing a common signal and sequencing the common signal to provide the plurality of control signals.

9. The method of claim 7 wherein the providing comprises providing the control signals comprising a plurality of different control signals, and sequencing the different control signals.

10. The method of claim 7 wherein the conditioning electrical energy comprises conditioning electrical energy of the fuel cells using the switch mode power conditioning circuits associated with respective ones of the fuel cells.

11. The method of claim 7 further comprising:

monitoring an electrical status of the fuel cells; and adjusting the control signals responsive to the monitoring.

12. The method of claim 11 wherein the providing comprises providing the control signals comprising pulse width modulated control signals and the adjusting comprises adjusting duty cycles of the control signals.

13. The method of claim 11 wherein the monitoring comprises monitoring the electrical status comprising individual voltages of the fuel cells, and the adjusting comprises reducing a duty cycle of one of the control signals responsive to the voltage of the respective fuel cell being outside a predetermined range.

14. The method of claim 11 wherein the monitoring comprises monitoring the electrical status comprising individual voltages of the fuel cells, and the adjusting comprises reducing duty cycles of the control signals responsive to the voltages of the respective fuel cells being below a threshold.

15. The method of claim 7 further comprising:

providing electrical energy to a battery coupled with the switch mode power conditioning circuits;

monitoring an electrical status of the battery; and adjusting the control signals responsive to the monitoring to maintain the electrical status of the battery within a range.

* * * * *

UNITED STATES PATENT AND TRADEMARK OFFICE
CERTIFICATE OF CORRECTION

PATENT NO. : 6,858,335 B2  Page 1 of 1
DATED : February 22, 2005
INVENTOR(S) : Timothy J. Schmidt et al.

It is certified that error appears in the above-identified patent and that said Letters Patent is hereby corrected as shown below:

Column 9,
Line 17, replace "power system lousing" with -- power system 10 using --.
Line 18, replace "port36." with -- port 36. --.

Column 26,
Lines 55-56, replace "energy storace device;" with -- energy storage device; --.

Signed and Sealed this

Sixth Day of September, 2005

JON W. DUDAS
*Director of the United States Patent and Trademark Office*